(12) United States Patent
Yoshioka et al.

(10) Patent No.: US 9,147,347 B2
(45) Date of Patent: Sep. 29, 2015

(54) VEHICLE DIRECTION IDENTIFICATION DEVICE, VEHICLE DIRECTION IDENTIFICATION METHOD AND PROGRAM THEREFOR

(75) Inventors: Mototaka Yoshioka, Osaka (JP); Shinichi Yoshizawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 505 days.

(21) Appl. No.: 13/610,029

(22) Filed: Sep. 11, 2012

(65) Prior Publication Data

US 2013/0010980 A1    Jan. 10, 2013

Related U.S. Application Data

(63) Continuation of application No. PCT/JP2012/000178, filed on Jan. 13, 2012.

(30) Foreign Application Priority Data

Jan. 18, 2011    (JP) .................................. 2011-008114

(51) Int. Cl.
*H04B 1/00*        (2006.01)
*G08G 1/16*        (2006.01)
*G01S 3/802*       (2006.01)
*G01S 3/808*       (2006.01)
(Continued)

(52) U.S. Cl.
CPC . *G08G 1/16* (2013.01); *G01S 3/802* (2013.01); *G01S 3/808* (2013.01); *G01S 15/42* (2013.01); *H04R 1/406* (2013.01); *H04R 3/005* (2013.01); *H04R 2430/03* (2013.01); *H04R 2430/20* (2013.01)

(58) Field of Classification Search
CPC ................................ G01S 3/808; G01S 3/8083
See application file for complete search history.

(56) References Cited

U.S. PATENT DOCUMENTS 5,175,710 A    12/1992    Hutson
5,245,587 A     9/1993    Hutson
(Continued)

FOREIGN PATENT DOCUMENTS

JP    58-35422    3/1983
JP    3-68883     3/1991
(Continued)

*Primary Examiner* — Joseph Saunders, Jr.
*Assistant Examiner* — James Mooney
(74) *Attorney, Agent, or Firm* — Wenderoth, Lind & Ponack, L.L.P.

(57) ABSTRACT

A vehicle direction identification device includes: a frequency analysis unit which analyzes phase of the surrounding sound in each analysis section specified by predetermined frequency regions and time intervals; a sound source direction identification unit which identifies a sound source direction indicating a direction of a sound included in the vehicle sound for each analysis section; a reflection information storage unit which stores (i) state information relating to rates of occurrence each of which are a count of the analysis sections of a corresponding one of the sound source directions, and (ii) reflection patterns each of which includes an estimated vehicle direction which is a vehicle direction associated with a set of the state information; and a vehicle direction identification unit which identifies a vehicle direction by checking the rates of occurrence obtained from an identification result by the sound source direction identification unit against one of the reflection patterns.

15 Claims, 23 Drawing Sheets

(51) Int. Cl.
*G01S 15/42* (2006.01)
*H04R 1/40* (2006.01)
*H04R 3/00* (2006.01)

(56) References Cited

U.S. PATENT DOCUMENTS

| | | | |
|---|---|---|---|
| 5,348,020 A | 9/1994 | Hutson | |
| 5,379,268 A | 1/1995 | Hutson | |
| 5,455,806 A | 10/1995 | Hutson | |
| 5,474,078 A | 12/1995 | Hutson | |
| 5,490,516 A | 2/1996 | Hutson | |
| 5,559,940 A | 9/1996 | Hutson | |
| 5,662,109 A | 9/1997 | Hutson | |
| 5,761,685 A | 6/1998 | Hutson | |
| 6,166,628 A * | 12/2000 | Andreas | 340/436 |
| 2009/0052687 A1 * | 2/2009 | Schwartz | 381/92 |
| 2009/0285409 A1 * | 11/2009 | Yoshizawa et al. | 381/92 |
| 2010/0097200 A1 * | 4/2010 | Hilsebecher et al. | 340/436 |
| 2010/0214086 A1 | 8/2010 | Yoshizawa et al. | |
| 2010/0228482 A1 * | 9/2010 | Yonak | 701/301 |
| 2011/0175755 A1 | 7/2011 | Yoshioka et al. | |

FOREIGN PATENT DOCUMENTS

| | | |
|---|---|---|
| JP | 5-92767 | 12/1993 |
| JP | 6-503888 | 4/1994 |
| JP | 8-94731 | 4/1996 |
| JP | 11-64090 | 3/1999 |
| JP | 2010-175431 | 8/2010 |
| JP | 2010-204104 | 9/2010 |
| JP | 2011-242343 | 12/2011 |
| JP | 2012-145461 | 8/2012 |
| WO | 92/10880 | 6/1992 |
| WO | 2008/056649 | 5/2008 |
| WO | 2010/035434 | 4/2010 |
| WO | 2011/001684 | 1/2011 |
| WO | 2012/098836 | 7/2012 |

\* cited by examiner

FIG. 7A

| Reflection pattern | Frequency (Hz) | Interval (ms) | First state | | Second state | | Estimated vehicle direction |
|---|---|---|---|---|---|---|---|
| | | | Direction (degrees) | Rate of occurrence threshold value | Direction (degrees) | Rate of occurrence threshold value | |
| 1 | 50 - 350 | 400 | 60° to the right (±15) | 500 (±250) | 60° to the right (±15) | 300 (±150) | Left |
| | | | 60° to the left (±15) | 100 (±50) | 60° to the left (±15) | 300 (±150) | |
| 2 | 50 - 350 | 400 | 60° to the right (±15) | 100 (±50) | 60° to the right (±15) | 300 (±150) | Right |
| | | | 60° to the left (±15) | 500 (±250) | 60° to the left (±15) | 300 (±150) | |
| 3 | 50 - 350 | 400 | 60° to the right (±15) | 300 (±150) | 60° to the right (±15) | 100 (±50) | Left |
| | | | 60° to the left (±15) | 300 (±150) | 60° to the left (±15) | 500 (±250) | |
| 4 | 50 - 350 | 400 | 60° to the right (±15) | 300 (±150) | 60° to the right (±15) | 500 (±250) | Right |
| | | | 60° to the left (±15) | 300 (±150) | 60° to the left (±15) | 100 (±50) | |

Right blind spot mode

Left blind spot mode

Direction display mode (input direction)

Shows direction of vehicle determined to be present

VEHICLE DIRECTION IDENTIFICATION DEVICE, VEHICLE DIRECTION IDENTIFICATION METHOD AND PROGRAM THEREFOR

CROSS REFERENCE TO RELATED APPLICATIONS

This is a continuation application of PCT Patent Application No. PCT/JP2012/000178 filed on Jan. 13, 2012, designating the United States of America, which is based on and claims priority of Japanese Patent Application No. 2011-008114 filed on Jan. 18, 2011. The entire disclosures of the above-identified applications, including the specifications, drawings and claims are incorporated herein by reference in their entirety.

TECHNICAL FIELD

One or more exemplary embodiments disclosed herein relate generally to vehicle direction identification devices which identify a direction in which a vehicle is present from vehicle sound, and particularly to a vehicle direction identification device which identifies a direction in which a vehicle is present even when vehicle sound coming from a blind spot shielded by a barrier is reflected.

BACKGROUND ART

One known conventional technique includes identifying a direction in which a vehicle is present using vehicle sound arrival time difference (see Patent Literature (PTL) 1, for example).

CITATION LIST

Patent Literature

[PTL 1] Japanese Unexamined Utility Model (Registration) Application Publication No. 5-92767
[PTL 2] Japanese Unexamined Patent Application Publication No. 8-94731

SUMMARY OF INVENTION

Technical Problem

However, the apparatus in PTL 1 relating to vehicle sound detection does not take into account a situation in which sound reflects off a barrier or the like. In a real world environment, sound reflects off a barrier or the like, causing a vehicle to be detected in a direction opposite that of the actual vehicle, or causing two vehicles to be detected, one in the direction of the actual vehicle and one in the direction of the reflection, thereby causing confusion for the driver.

On the other hand, the apparatus in PTL 2 attempts to circumvent reflected sound by setting a threshold value for air pressure of direct sound and processing that threshold value. For example, as is shown in FIG. 22A, when the sound pressure of reflected sound is low relative to the sound pressure of direct sound, reflected sound having low sound pressure can be removed with peak hold processing as shown in FIG. 22B.

However, in a real world environment, there is no difference in the sound pressure of direct sound and reflected sound due to the reflected sound resonating. As a result, it is not always possible to remove reflected sound with this method.

Moreover, when sound comes from a blind spot shielded by a barrier, there are instances in which the sound pressure of reflected sound is higher than direct sound that is diffracted prior to reaching the microphone. In these instances, a vehicle cannot be detected using conventional methods.

One non-limiting and exemplary embodiment provides a vehicle direction identification device specifically capable of extracting vehicle sound and identifying a direction in which a vehicle is present, even in an environment in which vehicle sound is reflected off a barrier.

Solution to Problem

In one general aspect, the techniques disclosed in here feature a vehicle direction identification device which identifies a direction in which a vehicle in a vicinity of a user vehicle is present from vehicle sound that originates from the vehicle and is obtained by a plurality of microphones, the vehicle direction identification device including: a frequency analysis unit configured to analyze phase of the vehicle sound in each of a plurality of analysis sections specified by predetermined frequency regions and predetermined time intervals; a sound source direction identification unit configured to identify, based on a result of the analysis obtained from the frequency analysis unit, a sound source direction for each of the plurality of analysis sections, the sound source direction indicating a direction from which a sound included in the vehicle sound originates; a reflection information storage unit configured to store reflection information including one or more reflection patterns each of which includes (i) a plurality of items of state information each relating to rates of occurrence and (ii) an estimated vehicle direction, the rates of occurrence each being a count of one or more of the analysis sections of a corresponding one of the sound source directions, and the estimated vehicle direction being a direction in which the vehicle is present that is associated with the set of the items of state information; and a vehicle direction identification unit configured to identify a direction in which the vehicle is present by checking the rates of occurrence against one of the reflection patterns, the rates of occurrence obtained from a result of the identification by the sound source direction identification unit.

In this way, the vehicle direction identification device is capable of identifying a direction in which the vehicle is present by determining a majority of the sound source directions calculated for each analysis section. At this time, the fact that the rate of occurrence of a sound source direction over time is different for reflective sound or otherwise is used to determine whether or not the obtained vehicle sound is reflected sound. Stored in the reflection information storage unit is a state transition model indicating the change over time in the rate of occurrence of a sound source direction, and an estimated vehicle direction corresponding to the state transition model. Consequently, even in a situation in which vehicle sound coming from a blind spot shielded by a barrier is reflected, the vehicle direction identification unit is capable of identifying a direction in which the vehicle is present by checking the obtained vehicle sound against one of the state transition models.

These general and specific aspects may be implemented using a system, a method, an integrated circuit, a computer program, or a computer-readable recording medium such as a CD-ROM, or any combination of systems, methods, integrated circuits, computer programs, or computer-readable recording media. Specifically, the present disclosure can not only be implemented as a vehicle direction identification device including characterizing processing units such as those described here, but as a method of vehicle direction identification in which the characterizing processing units included in the vehicle direction identification device are implemented as steps in a process, or a computer program for causing a computer to execute the characterizing steps included in the method of vehicle direction identification. Moreover, it goes without saying that the computer program can be circulated on storage media such as a compact disc-read only memory (CD-ROM) or over a communications network such as the Internet.

Furthermore, the vehicle direction identification device can be realized as a vehicle direction identification system which includes the vehicle direction identification device or a portion of the vehicle direction identification device.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

With one or more exemplary embodiments or features disclosed herein, it is possible to identify a direction in which a vehicle is present from vehicle sound, and particularly to identify a direction in which a vehicle is present even when vehicle sound coming from a blind spot shielded from view is reflected.

BRIEF DESCRIPTION OF DRAWINGS

These and other advantages and features of exemplary embodiments of the present disclosure will become apparent from the following description thereof taken in conjunction with the accompanying Drawings, by way of non-limiting examples of embodiments of the present disclosure. In the Drawings:

FIG. 7A shows an example of reflection information stored in the reflection information storage unit according to either the first or second embodiment;

DESCRIPTION OF EMBODIMENT(S)

Figure 1:
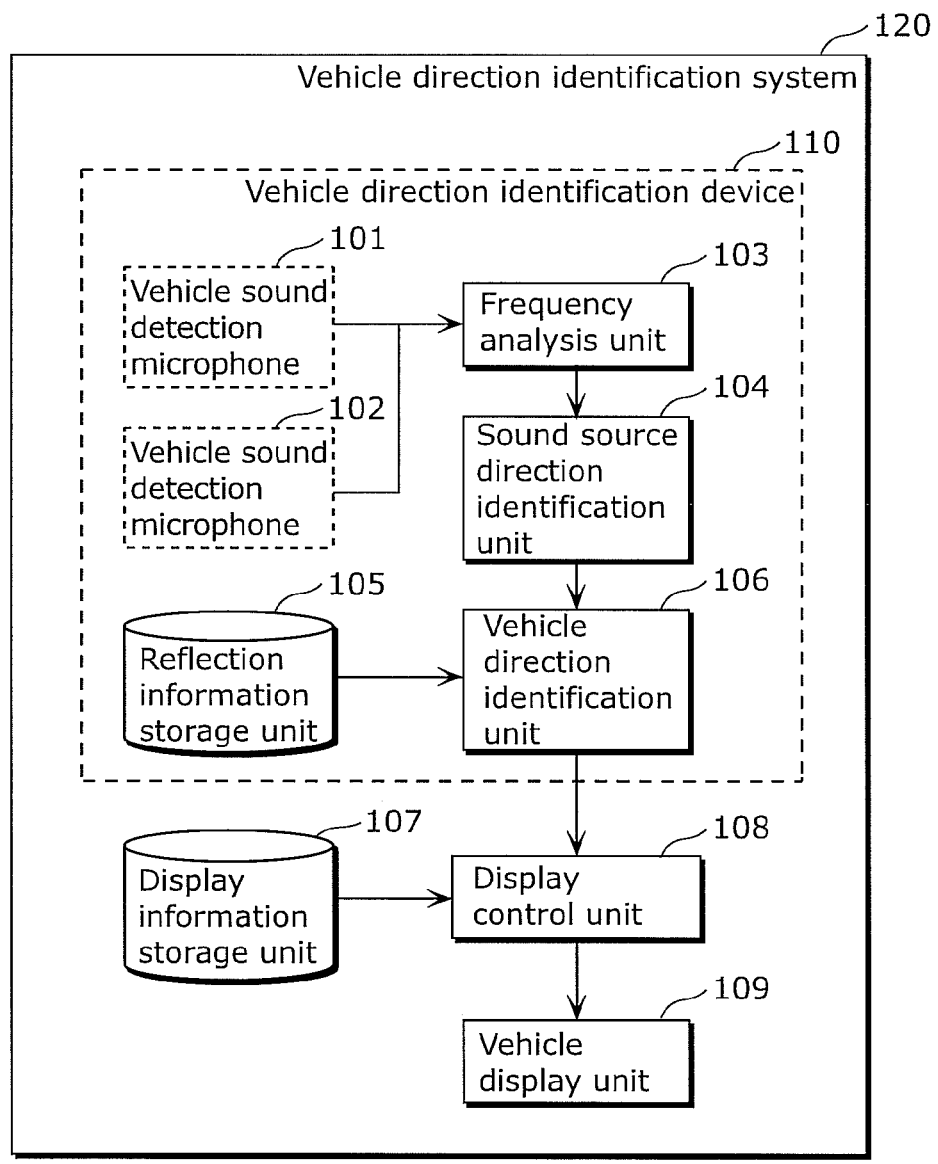
FIG. 1 is a block diagram showing a configuration of the vehicle direction identification system according to the first embodiment.

According to an exemplary embodiment described herein, a vehicle direction identification device which identifies a direction in which a vehicle in a vicinity of a user vehicle is present from vehicle sound that originates from the vehicle and is obtained by a plurality of microphones, the vehicle direction identification device including: a frequency analysis unit configured to analyze phase of the vehicle sound in each of a plurality of analysis sections specified by predetermined frequency regions and predetermined time intervals; a sound source direction identification unit configured to identify, based on a result of the analysis obtained from the frequency analysis unit, a sound source direction for each of the plurality of analysis sections, the sound source direction indicating a direction from which a sound included in the vehicle sound originates; a reflection information storage unit configured to store reflection information including one or more reflection patterns each of which includes (i) a plurality of items of state information each relating to rates of occurrence and (ii) an estimated vehicle direction, the rates of occurrence each being a count of one or more of the analysis sections of a corresponding one of the sound source directions, and the estimated vehicle direction being a direction in which the vehicle is present that is associated with the set of the items of state information; and a vehicle direction identification unit configured to identify a direction in which the vehicle is present by checking the rates of occurrence against one of the reflection patterns, the rates of occurrence obtained from a result of the identification by the sound source direction identification unit.

In this way, the vehicle direction identification device is capable of identifying a direction in which the vehicle is present by identifying a majority of the sound source directions calculated for each analysis section. At this time, the fact that the rate of occurrence of a sound source direction over time is different for reflective sound or otherwise is used to determine whether or not the obtained vehicle sound is reflected sound. Stored in the reflection information storage unit is a state transition model indicating the change over time in the rate of occurrence of a sound source direction, and an estimated vehicle direction corresponding to the state transition model. Consequently, even in a situation in which vehicle sound coming from a blind spot shielded from is reflected, the vehicle direction identification unit is capable of identifying a direction in which the vehicle is present by checking the obtained vehicle sound against one of the state transition models.

Specifically, (i) each of the reflection patterns may include first state information relating to the rates of occurrence in a first state, second state information relating to the rates of occurrence in a second state, and the estimated vehicle direction associated with a set including the first state information and the second state information, the second state lasting a predetermined length of time after the first state elapses, (ii) the first state information may include first direction information and second direction information which indicate a range of the sound source directions, first rate of occurrence information which is associated with the first direction information and indicates a range of the rates of occurrence, and second rate of occurrence information which is associated with the second direction information and indicates a range of the rates of occurrence, (iii) the second state information may include third direction information and fourth direction information which indicate a range of the sound source directions, third rate of occurrence information which is associated with the third direction information and indicates a range of the rates of occurrence, and fourth rate of occurrence information which is associated with the fourth direction information and indicates a range of the rates of occurrence, and (iv) when a plurality of the sound source directions in the first state meet conditions set forth as the first state information, and a plurality of the sound source directions in the second state meet conditions set forth as the second state information, the vehicle direction identification unit may determine that the vehicle sound is reflected sound, and may identify, as the direction in which the vehicle is present, the estimated vehicle direction associated with the set including the first state information and the second state information.

Accordingly, when the obtained vehicle sound is accepted by a state transition model included in a reflection pattern, the vehicle direction identification unit determines that the vehicle sound is reflected sound and can identify the direction in which the vehicle is located from the estimated vehicle direction included in the accepted reflection pattern.

More specifically, the vehicle direction identification unit may calculate the rates of occurrence for the plurality of the sound source directions included in the vehicle sound obtained in the first state which is a first time period, and when, from among the rates of occurrence calculated, (i) a total of the rates of occurrence for the sound source directions included in the range indicated by the first direction information is included in the range indicated by the first rate of occurrence information, and (ii) a total of the rates of occurrence for the sound source directions included in the range indicated by the second direction information is included in the range indicated by the second rate of occurrence information, the vehicle direction identification unit may calculate the rates of occurrence for the plurality of the sound source directions included in the vehicle sound obtained in the second state which is a second time period lasting the predetermined length of time after the first time period elapses, and when, from among the rates of occurrence newly calculated, (iii) a total of the rates of occurrence for the sound source directions included in the range indicated by the third direction information is included in the range indicated by the third rate of occurrence information, and (iv) a total of the rates of occurrence for the sound source directions included in the range indicated by the fourth direction information is included in the range indicated by the fourth rate of occurrence information, the vehicle direction identification unit may determine that the vehicle sound is reflected sound, and may identify the estimated vehicle direction associated with the set including the first state information and the second state information as the direction in which the vehicle is present.

The reflection information may include, for example, the one or more reflection patterns that are different for each frequency.

Specifically, a representative value of the range of the rates of occurrence indicated by the first rate of occurrence information and a representative value of the range of the rates of occurrence indicated by the second rate of occurrence information included in each of the reflection patterns may be set to increase as the frequency increases.

Generally, the higher the frequency of a sound, the higher the rate of occurrence will be. With this in mind, the vehicle direction identification unit can determine if a sound is reflected sound more adequately by changing the rate of occurrence information accordingly with respect to frequency.

Moreover, the reflection information may include one or more of the reflection patterns in which (i) an absolute value of a difference between representative values of respective ranges of the rates of occurrence indicated by two pieces of the rate of occurrence information included in one of the first state information and the second state information is less than a predetermined first difference, and (ii) an absolute value of a difference between representative values of respective ranges of the rates of occurrence indicated by two pieces of the rate of occurrence information included in the other of the first state information and the second state information is greater than a predetermined second difference that is greater than the first difference.

Generally, as a vehicle in a blind spot travels from the right to the left of the user vehicle, the situation goes from a state in which the rate of occurrence of reflected sound and direct sound (direct sound includes diffracted sound, same hereinafter) are about the same amount, to a state in which the rate of occurrence of direct sound exceeds that of reflected sound as the vehicle comes closer to the front of the user vehicle, and again to a state in which the rate of occurrence of reflected sound and direct sound are about the same amount. Consequently, by reflecting this trend in rate of occurrence of reflected sound and direct sound (including diffracted sound)

in the reflection pattern, the vehicle direction identification unit can determine if sound is reflected sound and identify a direction in which a vehicle is present.

Moreover, the reflection information may include one or more of the reflection patterns including, as the estimated vehicle direction, a direction corresponding to the direction information associated with the rate of occurrence information having a greater representative value of the third rate of occurrence information and the fourth rate of occurrence information when (i) an absolute value of a difference of a representative value of the range of the rates of occurrence indicated by the first rate of occurrence information and a representative value of the range of the rates of occurrence indicated by the second rate of occurrence information is less than the first difference, and (ii) an absolute value of a difference of a representative value of the range of the rates of occurrence indicated by the third rate of occurrence information and a representative value of the range of the rates of occurrence indicated by the fourth rate of occurrence information is greater than the second difference.

Moreover, the reflection information may include one or more of the reflection patterns including, as the estimated vehicle direction, a direction corresponding to the direction information associated with the rate of occurrence information having a greater representative value of the first rate of occurrence information and the second rate of occurrence information when (i) an absolute value of a difference of a representative value of the range of the rates of occurrence indicated by the first rate of occurrence information and a representative value of the range of the rates of occurrence indicated by the second rate of occurrence information is greater than the second difference, and (ii) an absolute value of a difference of a representative value of the range of the rates of occurrence indicated by the third rate of occurrence information and a representative value of the range of the rates of occurrence indicated by the fourth rate of occurrence information is less than the first difference.

The vehicle direction identification device according to another exemplary embodiment described herein further comprises a vehicle frequency identification unit configured to identify a reference frequency band for the vehicle sound, wherein the frequency analysis unit is configured to analyze the phase and amplitude of the vehicle sound in each of the plurality of analysis sections, the vehicle frequency identification unit is configured to identify, as an N-th reference frequency, a representative value that represents a frequency corresponding to an analysis section having an N-th highest amplitude among the plurality of analysis sections in a corresponding one of the time intervals, and identify, as an N-th reference frequency band, a frequency band having a predetermined range centered on the N-th reference frequency, and the vehicle direction identification unit is configured to identify the direction in which the vehicle is present by checking a plurality of the sound source directions corresponding to the plurality of analysis sections included in the N-th reference frequency band against the reflection information.

Generally, in a case in which two vehicles are actually present, one to the right and one to the left, and vehicle sound originates from the right and the left, the vehicle direction identification unit cannot determine if the sound is reflected sound when handling the individual vehicle sound directions as a single distribution. However, by separating the vehicle sound using reference frequency bands and identifying the direction in which the vehicle is present using the sound source directions included in each reference frequency band, the vehicle direction identification unit can determine if the vehicle sound is reflected sound and can identify the direction in which the vehicle is present.

Moreover, the vehicle direction identification unit may assign greater weight to an analysis section among the plurality of analysis sections having a greater degree of similarity to an adjacent one of the plurality of analysis sections with respect to the respective sound source directions, and may calculate the rates of occurrence for the respective sound source directions as a count of the weighted plurality of analysis sections in a corresponding one of the sound source directions.

In this way, a decrease in vehicle direction identification accuracy resulting from a variation in sound source direction can be prevented by keeping influence from instantaneous and random noises such as wind noise to a minimum.

Moreover, the sound source direction identification unit may determine, for each of the plurality of analysis sections, whether the amplitude of the vehicle sound therein is below a sound pressure threshold value or not, and configured to avoid identifying one of the plurality of analysis sections for identification of the vehicle direction when the amplitude of the vehicle sound therein is below the sound pressure threshold value, and the sound pressure threshold value may increase as a frequency corresponding to the analysis section increases.

Generally, noise such as wind noise tends to remain lower than a fixed amplitude. Consequently, the direction in which a vehicle is present can be identified with increased accuracy by removing noise not necessary to the identification before identifying the sound source direction.

In the vehicle direction identification system according to another exemplary embodiment described herein, the vehicle direction identification unit may assign greater weight to an analysis section among the plurality of analysis sections having a greater degree of similarity to an adjacent one of the plurality of analysis sections with respect to the respective sound source directions, and may calculate the rates of occurrence for the respective sound source directions as a count of the weighted plurality of analysis sections in a corresponding one of the sound source directions.

In this way, the amount of information to be displayed on the vehicle display unit can be controlled adequately and accordingly with respect to the position and visibility of the vehicle from the perspective of the user vehicle.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are described as arbitrary structural elements.

Embodiment 1

The vehicle direction identification device according to the first embodiment will be described.

FIG. 1 shows a configuration of the vehicle direction identification system including the vehicle direction identification device according to the first embodiment of the present disclosure.

As shown in FIG. 1, a vehicle direction identification system 120 includes a vehicle direction identification device 110, a display information storage unit 107, a display control unit 108, and a vehicle display unit 109.

The vehicle direction identification device 110 is a device which detects a direction in which a vehicle is present using vehicle sound obtained by a plurality of microphones from a vehicle present in the vicinity of the user vehicle. The vehicle direction identification device 110 includes a vehicle sound detection microphone 101 and 102, a frequency analysis unit 103, a sound source direction identification unit 104, a reflection information storage unit 105, and a vehicle direction identification unit 106.

The vehicle sound detection microphone 101 and 102 each detect vehicle sound coming from the vehicle, including engine sound, motor sound, and driving sound of the vehicle, for example. The vehicle sound detection microphone 101 and 102 detect a mix of sounds including vehicle sound and noise such as wind noise when microphones installed in the user vehicle are used as the vehicle sound detection microphone 101 and 102.

The vehicle sound detection microphone 101 and 102 are fitted, for example, to the front bumper of the vehicle on the left and right. It is to be noted that the vehicle sound detection microphone 101 and 102 may be installed in a different location where detection of vehicle sound is possible, such as on the side mirrors, on the roof, or under the hood of the vehicle. For example, the speakers should be oriented facing a direction that is orthogonal to the direction of travel of the vehicle and positioned as far apart as possible. This will allow the sound source direction identification unit (to be described later) to identify the sound source direction with increased accuracy.

The frequency analysis unit 103 performs a frequency analysis of the sound information obtained by the vehicle sound detection microphone 101 and 102 in order to analyze the phase of the vehicle sound in each of the analysis sections which are specified by the predetermined frequency bands and the predetermined time intervals. For example, the frequency analysis unit 103 processes the sound information using a Fourier transform process to obtain the frequency signal, amplitude, and phase of the sound. It is to be noted that the frequency analysis unit 103 may perform a frequency conversion process by a frequency conversion method other than Fourier transform, such as fast Fourier transform, discrete cosine transform, or wavelet transform. It is to be noted that the frequency analysis unit 103 may analyze the amplitude of the vehicle sound.

The sound source direction identification unit 104 is a processing unit which identifies, based on a result of the analysis obtained from the frequency analysis unit, a sound source direction for each of the analysis sections. The sound source direction indicates a direction from which a sound included in the surrounding sound originates.

It is to be noted that due to the vehicle sound detection microphone 101 and 102 additionally detecting noise such as wind noise, the sound source direction identification unit 104 may, for example, establish a threshold value for amplitude and extract from the surrounding sound only sound having a level of amplitude greater than or equal to the threshold value as vehicle sound for sound source direction identification. The sound source direction identification unit 104 may also remove noise from the surrounding sound by spectral subtraction, for example, and use the remaining sound as vehicle sound for sound source direction identification.

Hereinafter, principles for the identification of a sound source direction by the sound source direction identification unit 104 are discussed with reference to FIG. 2 and FIG. 3.

Figure 2:
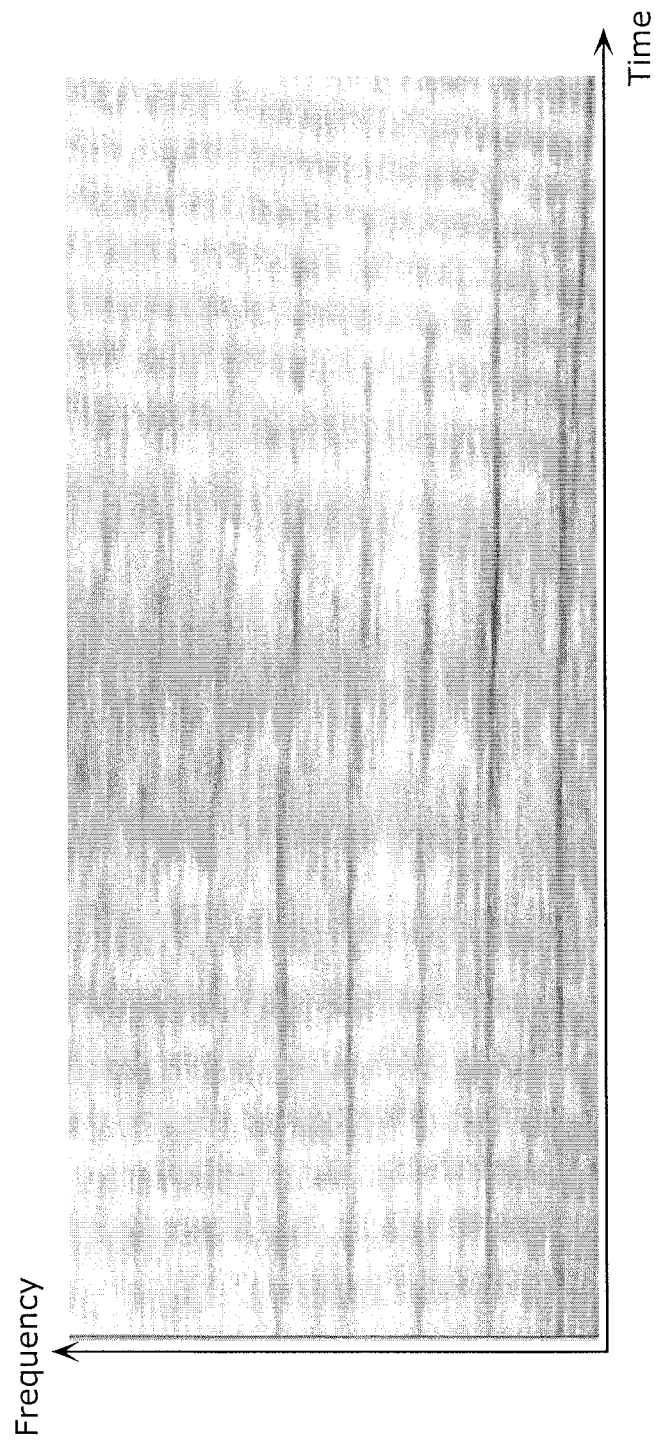
FIG. 2 shows a second drawing for explaining vehicle sound.

FIG. 2 is a spectrogram which shows a result of a frequency analysis of engine sound from an actual vehicle detected by a microphone. The vertical axis represents frequency, and the horizontal axis represents time. The darkness represents the power of the frequency signal, where the darker regions are the more powerful regions. Since vehicle sound is sound emanating from the engine or muffler which vibrates rhythmically, the sound has a specific frequency component, similar to a sine wave.

It is to be noted that the vehicle sound detection microphone 101 and 102 also detect noise such as wind noise. The sound source direction identification unit 104 therefore, for example, establishes a threshold value for amplitude and from the sound detected by the vehicle sound detection microphone 101 and 102, extracts only sound having a level of amplitude greater than or equal to the threshold value as vehicle sound for sound source direction identification. The sound source direction identification unit 104 may also remove noise from the surrounding sound by spectral subtraction, for example, and use the remaining sound as vehicle sound for sound source direction identification.

Figure 3:
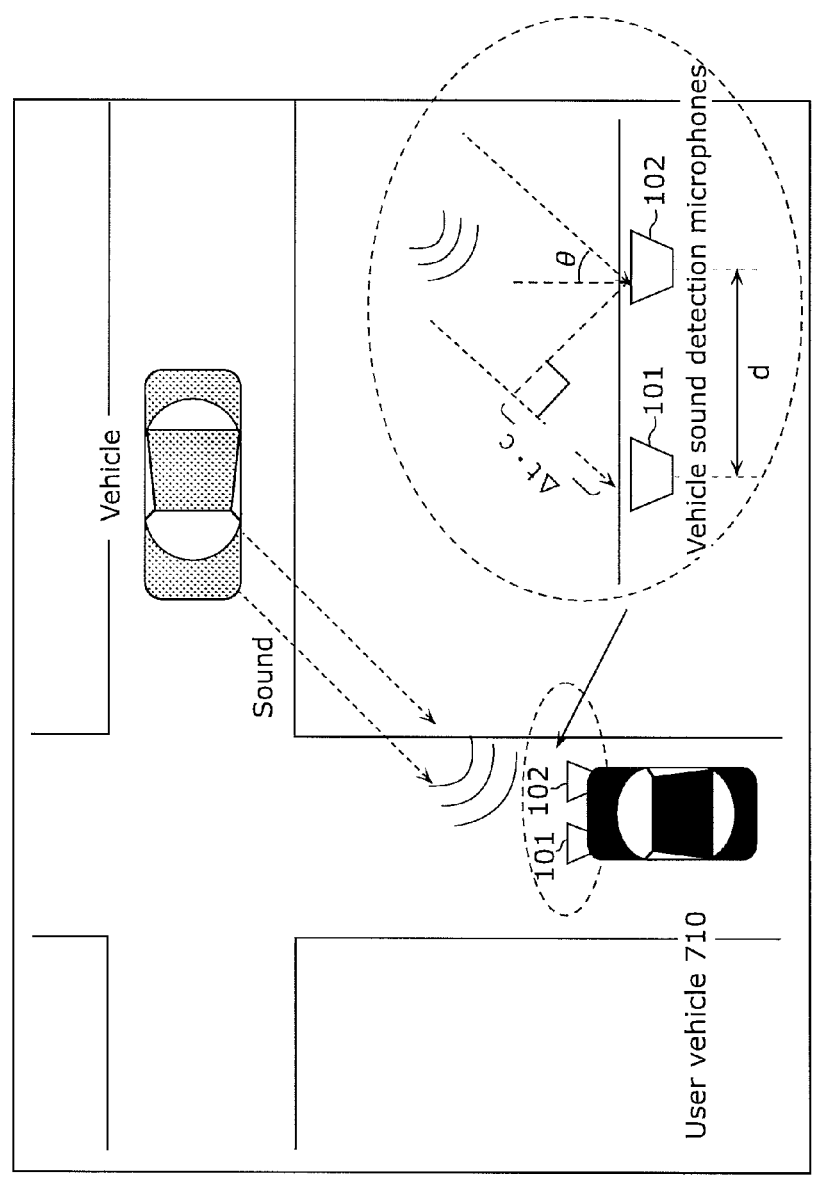
FIG. 3 shows a drawing for explaining the identification of a direction of vehicle sound.

FIG. 3 shows a method used by the sound source direction identification unit 104 of identifying the sound source direction for each analysis section.

As shown in FIG. 3, the vehicle sound detection microphone 101 and 102 are fitted to the bumper of a user vehicle. The time it takes for the vehicle sound to reach each of the microphones differs depending on the direction in which a vehicle is present relative to the direction of travel of the user vehicle.

Here, the distance between the positions of the vehicle sound detection microphone 101 and 102 is expressed as d (m). Moreover, the vehicle is detected from the direction θ (radian) relative to the direction of travel of the user vehicle. Furthermore, arrival time difference, which is the difference in time it takes for the same vehicle sound to reach the vehicle sound detection microphone 101 and the vehicle sound detection microphone 102, is expressed as Δt (s), and speed of sound is expressed as c (m/s). The direction θ (radian) can be calculated for with Equation 1 shown below.

[Math 1]

$$\theta = \sin^{-1}(\Delta t c/d) \qquad \text{(Equation 1)}$$

Consequently, the sound source direction identification unit 104 obtains, for each analysis section, the phase difference, which corresponds to the arrival time difference, of the same sound included in the surrounding sound detected by each of the vehicle sound detection microphone 101 and the vehicle sound detection microphone 102. The sound source direction identification unit 104 can then identify the sound source direction by plugging the obtained phase differences into the above-noted Equation 1.

However, in a real world environment, sound reflects off barriers such as buildings and walls. Reflected sound greatly influences techniques of vehicle detection which use sound in particular, as sound arriving at the microphones is used as-is to identify the direction of the sound source. Consequently, the direction of the reflected sound is identified as the direction that a vehicle is present in, resulting in the direction showing up as direction opposite that of the vehicle. For this reason, the influence reflected sound has on the detection of vehicles cannot be ignored.

Figure 4:
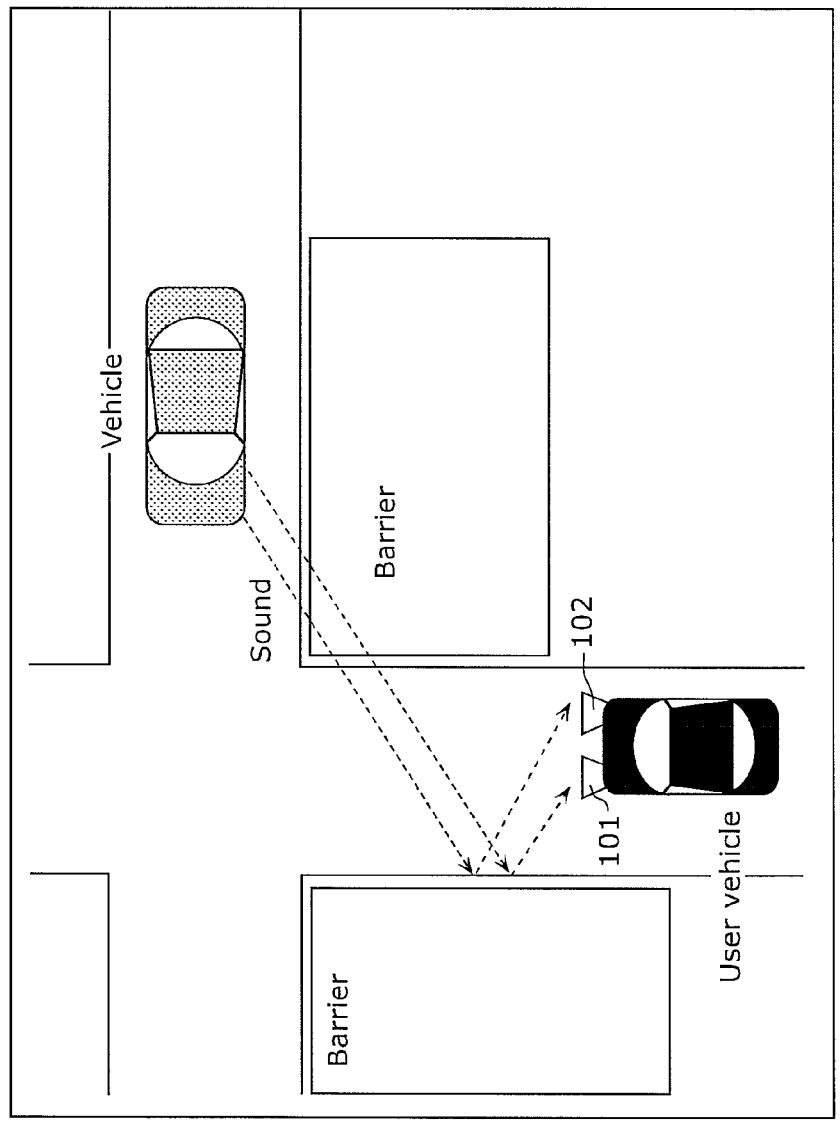
FIG. 4 shows an example of reflected vehicle sound.

FIG. 4 shows an example of vehicle sound being reflected. The position of the vehicle with respect to the user vehicle is the same as in FIG. 3. However, in FIG. 4, the sound reflects off a barrier present in the environment at the traffic intersection. If the direction were identified using the arrival time difference as-is, the vehicle direction identification device 110 would determine that the vehicle is present to the left of the user vehicle, regardless of the vehicle actually being to the right of the user vehicle. Consequently, the vehicle direction identification device 110 would erroneously identify the direction in which the vehicle is present.

Techniques for vehicle detection in an environment in which a barrier such as a wall inhibits the field of view at a traffic intersection are particularly important. However, if this were the case, the vehicle direction identification device 110 would mistakenly notify the user of a direction opposite that of the direction in which the vehicle is present.

Figure 5:
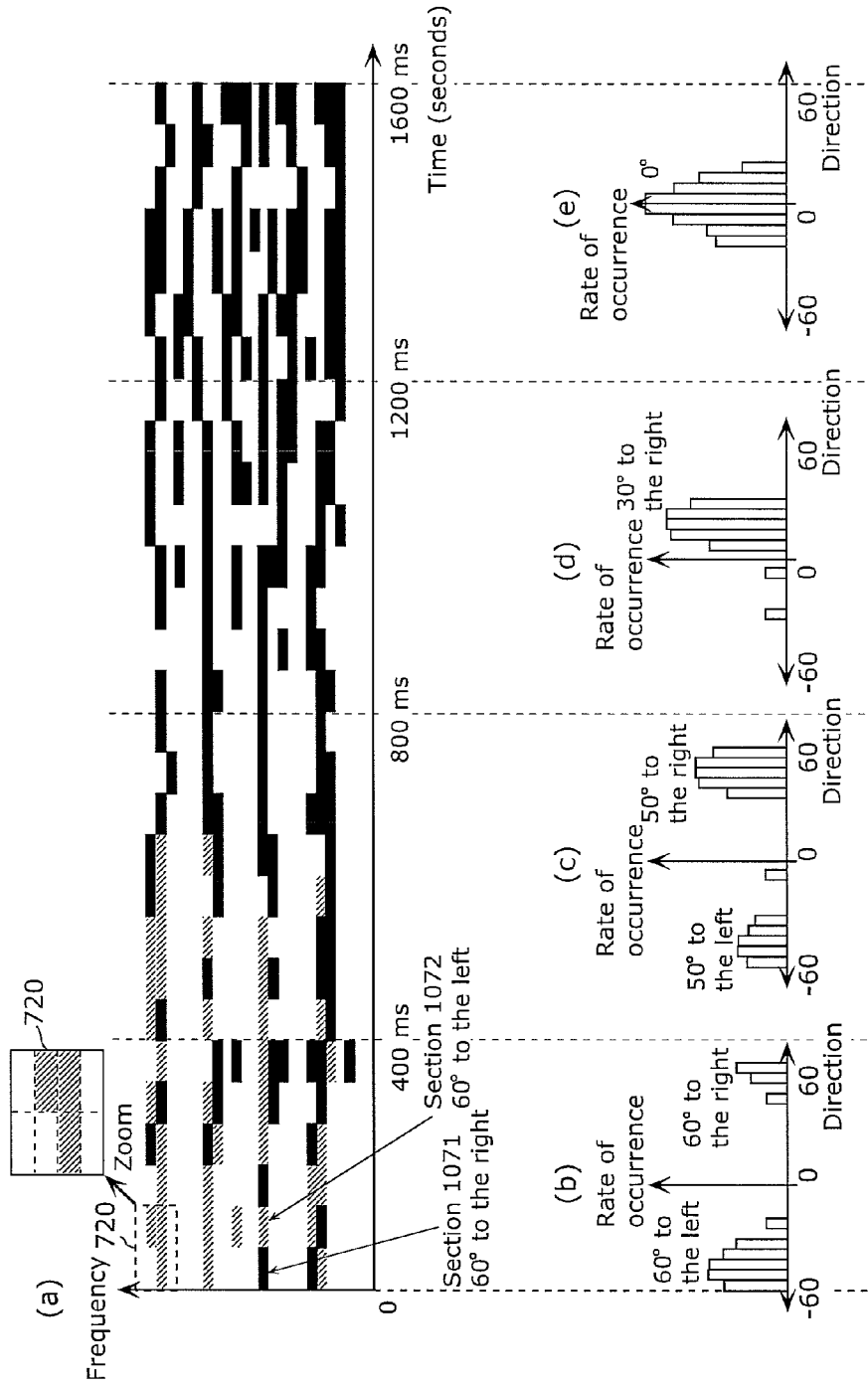
FIG. 5 shows a drawing for explaining sound source directions of predetermined analysis sections.

FIG. 5 shows a drawing for explaining sound source directions of predetermined analysis sections. Specifically, (a) in FIG. 5 shows a result of the sound source direction identification unit 104 identifying a direction of each analysis section.

In (a) in FIG. 5, the vertical axis represents frequency, and the horizontal axis represents time. The analysis sections for which a direction has been identified are colored solid black or with diagonal lines. Here, the analysis sections are set, for example, in 5 Hz increments with respect to frequency and 60 ms increments with respect to time. The direction from which the sound originates in each analysis section is identified.

That is, the frequency and time shown in (a) in FIG. 5 are divided into predetermined frequency bands and predetermined time intervals, thereby combining to define a plurality of analysis sections as shown in the enlarged view of a region 720. Here, the colored analysis sections in (a) in FIG. 5 represents an analysis section whose direction of sound has been identified by the sound source direction identification unit 104.

For example, the sound source direction for an analysis section 1071 is identified as 60 degrees to the right with respect to the user vehicle (here, the front of the user vehicle is 0 degrees, where positive values are to the right of the front of the user vehicle and negative values are to the left of the front of the user vehicle).

Moreover, the sound source direction for an analysis section 1072 is identified as 60 degrees to the left with respect to the user vehicle.

It is to be noted that for the purpose of explanation, in the first embodiment, the analysis sections having a sound source direction identified as being to the right of the user vehicle are colored solid black, while the analysis sections having a sound source direction identified as being to the left of the user vehicle are colored with diagonal lines. As a result, each colored section represents a section for which a direction has been calculated. Moreover, a total number the plurality of analysis sections of a corresponding one of the sound source directions is called the rate of occurrence. Furthermore, the distribution of the rate of occurrence for each sound source direction is called the rate of occurrence distribution.

For example, (b) in FIG. 5 shows a rate of occurrence distribution of the sound source directions included in the vehicle sound detected by the vehicle sound detection microphone 101 and 102 between 0 and 400 ms. Here, the horizontal axis represents direction, and the vertical axis represents rate of occurrence. In (b) in FIG. 5, for example, the highest rates of occurrence occur around 60 degrees to the left, while other rates of occurrence can also be seen around 60 degrees to the right. As shown in FIG. 4, the vehicle is actually to the right of the user vehicle, but in a real world environment, reflected sound arrives at the vehicle sound detection microphone 101 and 102 from the left of the user vehicle, as is shown by the increase in the rates of occurrence for the sound source directions to the left. Moreover, vehicle sound diffracts over and around barriers such as houses. As a result, vehicle sound also arrives at the vehicle sound detection microphone 101 and 102 from the right of the user vehicle. When the vehicle is far away from the user vehicle, the vehicle sound greatly attenuates due to diffraction, and sound amplitude decreases. Consequently, the rates of occurrence for the sound source directions to the left representing the reflected sound tend to be greater than the diffracted sound in this situation.

In the situation presented in (b) in FIG. 5, if the vehicle direction identification device 110 were to identify the direction having the highest rate of occurrence as the position in which the vehicle is present, the position of the vehicle would be identified at 60 degrees to the left, despite the fact that the vehicle is actually present to the right of the user vehicle as shown in FIG. 4. This would cause confusion for the user. Moreover, if the threshold value were lowered, a plurality of vehicles would be identified as being present to the right and left of the user vehicle, causing confusion for the user as well.

(c) in FIG. 5 shows a rate of occurrence distribution of the sound source directions included in the vehicle sound detected by the vehicle sound detection microphone 101 and 102 between 400 and 800 ms. Here, a situation is shown in which some time has elapsed since the situation shown in (b) of FIG. 5 and in which the vehicle has traveled to a different location. As shown in (c) in FIG. 5, the highest rates of occurrence occur around 50 degrees to the right, while other rates of occurrence can also be seen around 50 degrees to the left. The shift from the situation in (b) in FIG. 5 to the situation in (c) in FIG. 5 occurs in a real world environment. As a result of the influence of reflected sound, the rates of occurrence for the directions opposite that of the actual vehicle are high initially, but as the vehicle travels closer to the user vehicle, the influence of the reflected sound decreases while the arrival of direct sound and diffracted sound increases, resulting in an increase in the rates of occurrence for the sound source directions to the right, where the vehicle is actually present.

(d) in FIG. 5 shows a rate of occurrence distribution of the sound source directions included in the vehicle sound detected by the vehicle sound detection microphone 101 and 102 between 800 and 1200 ms. Here, a situation is shown in which some time has elapsed since the situation shown in (c) of FIG. 5 and in which the vehicle has again traveled to a different location. In the case of (d) in FIG. 5, the rates of occurrence are the greatest around 30 degrees to the right where the vehicle is present, and the influence of reflected sound is virtually nonexistent.

(e) in FIG. 5 shows a rate of occurrence distribution of the sound source directions included in the vehicle sound detected by the vehicle sound detection microphone 101 and 102 between 1200 and 1600 ms. Here, a situation is shown in which some time has elapsed since the situation shown in (d) of FIG. 5 and in which the vehicle has yet again traveled to a different location. In the case of (e) in FIG. 5, the rates of occurrence are the greatest at around 0 degrees where the vehicle is present, and the influence of reflected sound is virtually nonexistent.

Figure 6:
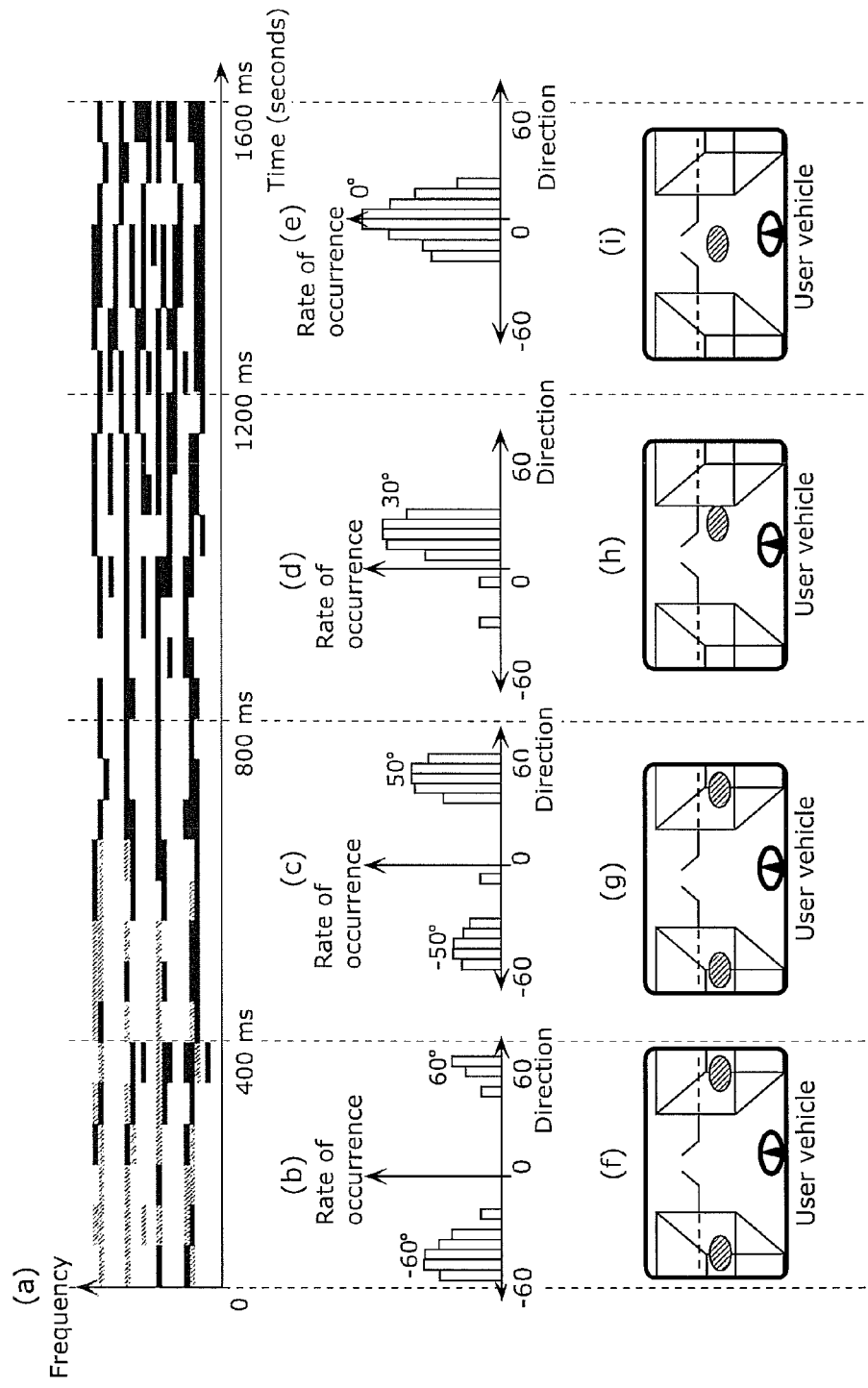
FIG. 6 is a first drawing showing an example of the relationship of the correspondence between the identified direction and the display by the vehicle display unit if the vehicle direction identification device were to have identified the direction having the highest rate of occurrence as the position in which the vehicle is present.

FIG. 6 is a first example showing the relationship of the correspondence between the identified direction and the display by the vehicle display unit if the vehicle direction identification device 110 were to have identified the direction having the highest rate of occurrence as the position in which the vehicle is present. The vehicle display unit is, for example, a liquid crystal display.

Specifically, similar to (a) in FIG. 5, (a) in FIG. 6 shows a result of the sound source direction identification unit 104 identifying a sound source direction for each analysis section. Moreover, similar to (b) through (e) in FIG. 5, (b) through (e) in FIG. 6 each show a histogram of the distribution of the rates of occurrence for the sound source directions identified in a 400 ms time period. That is, FIG. 6 shows the rate of occurrence distribution of the rates of occurrence identified from the vehicle sound detected by the vehicle sound detection microphone 101 and 102 for the respective time periods in (b) in FIG. 6 (0 ms to 400 ms), (c) in FIG. 6 (400 ms to 800 ms), (d) in FIG. 6 (800 ms to 1200 ms), and (e) in FIG. 6 (1200 ms to 1600 ms).

(f) in FIG. 6 is an example of a display shown on the vehicle display unit 109 depicting the direction in which the vehicle is present as detected between 0 ms and 400 ms. Vehicles are shown to the left and the right due to the peaks in the rates of occurrence at 60 degrees to the left and 60 degrees to the right. Consequently, the user waiting at the traffic intersection will be misled into believing that vehicles both to the left and the right are present.

(g) in FIG. 6 is an example of a display shown on the vehicle display unit 109 depicting the direction in which the vehicle is present as detected between 400 ms and 800 ms. Similarly, vehicles are shown on the left and the right due to the peaks in the rates of occurrence at 60 degrees to the left and 60 degrees to the right.

(h) in FIG. 6 is an example of a display shown on the vehicle display unit 109 depicting the direction in which the vehicle is present as detected between 800 ms and 1200 ms. Here, when a vehicle is displayed at the position corresponding to the direction of the sound source represented by the peak in the rates of occurrence at 30 degrees to the right, the vehicle to the left suddenly disappears, and only the vehicle to the right is shown to be present.

(i) in FIG. 6 is an example of a display shown on the vehicle display unit 109 depicting the direction in which the vehicle is present as detected between 1200 ms and 1600 ms. Here, a vehicle is displayed in the center due to the peak in the rates of occurrence at 0 degrees which represents the direction of the sound source. The vehicle to the left has disappeared, and the vehicle which was detected to the right appears as passing in front of the user vehicle.

As presented, it is generally difficult to identify a direction in which a vehicle is present in an environment in which vehicle sound is reflected off a barrier. For that reason, the vehicle direction identification device 110 according to the first embodiment performs vehicle direction identification which takes into account the influence of reflected sound with the vehicle direction identification unit 106 using reflection information stored in the reflection information storage unit 105. Moreover, the vehicle direction identification system 120 according to the first embodiment provides a safer driving experience by notifying the user of the result of the identification performed by the vehicle direction identification device 110. This will be explained further below with reference to the Drawings.

FIG. 7A shows an example of reflection information stored in the reflection information storage unit 105. As shown in FIG. 7A, the reflection information storage unit 105 stores reflection information which includes a plurality of reflection patterns.

It is to be noted that reflection information is a generic term for the information (reflection patterns) that relates to the state transition of the rate of occurrence distribution for the identified sound source directions in the case that upon identifying the direction of a vehicle using vehicle sound in a real world environment, the vehicle sound that reaches the microphones is sound which has reflected off a barrier, for instance.

A reflection pattern includes a plurality of state information relating to rate of occurrence, and an estimated vehicle direction which is a vehicle direction that is associated with the set of the plurality of state information. Specifically, a reflection pattern is information which includes first state information relating to the rates of occurrence in a first state, second state information relating to the rates of occurrence in a second state, and the estimated vehicle direction associated with a set including the first state information and the second state information. Here, the second state lasts a predetermined length of time after the first state elapses, and the estimated vehicle direction is a direction in which the vehicle is located.

FIG. 7A shows reflection information which includes four reflection patterns.

The reflection pattern according to the first embodiment includes a state transition of the rate of occurrence distribution as, for example, a two state automaton transition model. Each state (for example, the first state, or the second state) includes information used for calculating the rates of occurrence which includes information for the frequency band, information for the range of the sound source directions to be analyzed, and information for the range (or distribution) of the rates of occurrence. The transition from one state to another takes place after a predetermined interval of time has elapsed.

That is, the first state information includes (i) first direction information and second direction information which indicate a range of the sound source directions, (ii) first rate of occurrence information associated with the first direction information and indicating a range of the rates of occurrence, and (iii) second rate of occurrence information associated with the second direction information and indicating a range of the rates of occurrence.

Moreover, the second state information includes (i) third direction information and fourth direction information which indicate a range of the sound source directions, (ii) third rate of occurrence information associated with the third direction information and indicating a range of the rates of occurrence, and (iii) fourth rate of occurrence information associated with the fourth direction information and indicating a range of the rates of occurrence.

Here, the reflection information may include one or more reflection patterns that are different for each frequency.

Moreover, as shown in FIG. 7A, the reflection patterns included in the reflection information according to the first embodiment represent the trends described below.

That is, the reflection patterns 1 through 4 are reflection patterns in which (i) an absolute value of a difference between representative values (here, a representative value is an arbitrary statistic, such as an average value, a median, or a quartile) of respective ranges of the rates of occurrence indicated by two pieces of the rate of occurrence information included in one of the first state information and the second state information is less than a predetermined first difference, and (ii) an absolute value of a difference between representative values of respective ranges of the rates of occurrence indicated by two pieces of the rate of occurrence information included in the other of the first state information and the second state information is greater than a predetermined second difference that is greater than the first difference.

This trend in the reflection pattern derives from the fact that generally, as a vehicle in a blind spot travels from the right to the left of the user vehicle, the situation goes from a state in which the rate of occurrence of reflected sound and direct sound (direct sound includes diffracted sound, same hereinafter) are about the same amount, to a state in which the rate of occurrence of direct sound exceeds that of reflected sound as the vehicle comes closer to the front of the user vehicle, and again to a state in which the rate of occurrence of reflected sound and direct sound are about the same amount.

Moreover, the reflection patterns 3 and 4 include, as the estimated vehicle direction, a direction corresponding to the direction information associated with the rate of occurrence information having a greater representative value of the third rate of occurrence information and the fourth rate of occurrence information when (i) an absolute value of a difference of a representative value of the range of the rates of occurrence indicated by the first rate of occurrence information and a representative value of the range of the rates of occurrence indicated by the second rate of occurrence information is less than the first difference, and (ii) an absolute value of a difference of a representative value of the range of the rates of occurrence indicated by the third rate of occurrence information and a representative value of the range of the rates of occurrence indicated by the fourth rate of occurrence information is greater than the second difference.

That is, the reflection pattern 3 and 4 (i) indicate that the vehicle, which is either to the right or to the left of the user vehicle, is moving towards the front of the user vehicle (closer to the user vehicle), and (ii) correspond to a transition from a state in which the rate of occurrence of reflected sound and direct sound are about the same to a state in which the rate of occurrence of direct sound exceeds that of the reflected sound. Moreover, the direction in which the vehicle is present is considered to be the direction from which the direct sound arrives. This is the trend represented in the reflection pattern 3 and 4.

Moreover, the reflection patterns 1 and 2 include, as the estimated vehicle direction, a direction corresponding to the direction information associated with the rate of occurrence information having a greater representative value of the first rate of occurrence information and the second rate of occurrence information when (i) an absolute value of a difference of a representative value of the range of the rates of occurrence indicated by the first rate of occurrence information and a representative value of the range of the rates of occurrence indicated by the second rate of occurrence information is greater than the second difference, and (ii) an absolute value of a difference of a representative value of the range of the rates of occurrence indicated by the third rate of occurrence information and a representative value of the range of the rates of occurrence indicated by the fourth rate of occurrence information is less than the first difference.

That is, the reflection pattern 1 and 2 (i) indicate that the vehicle, which is in the vicinity of the front of the user vehicle, is moving towards a blind spot to the left or right (away from the user vehicle), and (ii) correspond to a transition from a state in which the rate of occurrence of direct sound exceeds that of the reflected sound to a state in which the rate of occurrence of reflected sound and direct sound are about the same. Moreover, the direction in which the vehicle is present is considered to be the direction opposite that from which the direct sound in the first state arrives. This is the trend represented in the reflection pattern 1 and 2.

When a plurality of the sound source directions in the first state meet conditions set forth as the first state information, and a plurality of the sound source directions in the second state meet conditions set forth as the second state information, the vehicle direction identification unit 106 determines that the vehicle sound is reflected sound, and identifies, as the direction in which the vehicle is present, the estimated vehicle direction associated with the set including the first state information and the second state information.

Assume here that the vehicle sound obtained by the vehicle sound detection microphone 101 and 102 in a predetermined period of time (for example 400 ms in FIG. 7A) meets the conditions set forth in the first state information. In this case, the vehicle direction identification unit 106 transitions from one state in the reflection pattern to the second state. Moreover, assume that after transitioning to the second state, the vehicle sound obtained by the vehicle sound detection microphone 101 and 102 in a predetermined period of time (for example 400 ms) meets the conditions set forth in the second state information. In this case, the vehicle direction identification unit 106 determines that the input vehicle sound has been accepted by the reflection pattern. As a result, the vehicle direction identification unit 106 estimates that the direction in which the vehicle is present is the estimated vehicle direction included in the reflection pattern that accepted the vehicle sound.

For example, the reflection pattern depicted as reflection pattern 1 in FIG. 7A includes first state information as conditions to be met in the first state, including: the frequency band of the vehicle sound used is from 50 Hz to 350 Hz; the rate of occurrence within an accepted range of plus-minus (±) 15 degrees from the sound source direction 60 degrees to the right is 500 (±250); and the rate of occurrence within an accepted range of plus-minus (±) 15 degrees from the sound source direction 60 degrees to the left is 100 (±50).

Moreover, the reflection pattern 1 includes second state information as conditions to be met in the second state, including: the frequency band of the vehicle sound used is from 50 Hz to 350 Hz; the rate of occurrence within an accepted range of plus-minus (±) 15 degrees from the sound source direction 60 degrees to the right is 300 (±150); and the rate of occurrence within an accepted range of plus-minus (±) 15 degrees from the sound source direction 60 degrees to the left is 300 (±150).

The first state is set to transition to the second state after 400 ms, which is a predetermined interval of time. In the case that the transition is matches, reflection pattern 1 includes estimated vehicle direction information which states that the vehicle is actually to the left of the user vehicle.

For example, when a vehicle is to the left in a blind spot shielded by a barrier and the vehicle direction identification unit 106 calculates, from vehicle sound, a rate of occurrence distribution for directions similar to the distribution shown in (b) in FIG. 5, the rate of occurrence within ±15 degrees of 60 degrees to the right is 500 (±250), and the rate of occurrence within ±15 degrees of 60 degrees to the left is 100 (±50). The conditions for acceptance set forth in the first state are therefore met. Consequently, the process transitions to the second state. Furthermore, after 400 ms has elapsed, the rate of occurrence within ±15 degrees of 60 degrees to the right is 300 (±250), and the rate of occurrence within ±15 degrees of 60 degrees to the left is 300 (±50). The conditions for acceptance set forth in the second state are therefore met. As a result, the vehicle sound is accepted as sound which meets the transition pattern expressed by reflection pattern 1, and the vehicle direction identification unit 106 determines the transition to be reflection pattern 1.

In other words, the vehicle direction identification unit 106 identifies the direction in which the vehicle is present by checking the sound source directions identified by the sound source direction identification unit 104 against the reflection information.

Specifically, the vehicle direction identification unit 106 calculates the rates of occurrence for the plurality of the sound source directions included in the vehicle sound obtained in the first state which is a first time period. Next, when, from among the rates of occurrence calculated, (i) a total of the rates of occurrence for the sound source directions included in the range indicated by the first direction information is included in the range indicated by the first rate of occurrence information, and (ii) a total of the rates of occurrence for the sound source directions included in the range indicated by the second direction information is included in the range indicated by the second rate of occurrence information, the vehicle direction identification unit 106 calculates the rates of occurrence for the plurality of the sound source directions included in the vehicle sound obtained in the second state which is a second time period lasting the predetermined length of time after the first time period elapses.

Next, when, from among the rates of occurrence newly calculated, (iii) a total of the rates of occurrence for the sound source directions included in the range indicated by the third direction information is included in the range indicated by the third rate of occurrence information, and (iv) a total of the rates of occurrence for the sound source directions included in the range indicated by the fourth direction information is included in the range indicated by the fourth rate of occurrence information, the vehicle direction identification unit 106 determines that the vehicle sound is reflected sound, and identifies the estimated vehicle direction associated with the set including the first state information and the second state information as the direction in which the vehicle is present.

It is to be noted that when the vehicle sound obtained in a predetermined time period does not correspond with any of the reflection patterns stored in the reflection information storage unit 105, the vehicle direction identification unit 106 may determine that no reflected sound has reached the microphones, that is, that only direct sound from the vehicle has reached the microphones.

Figure 8:
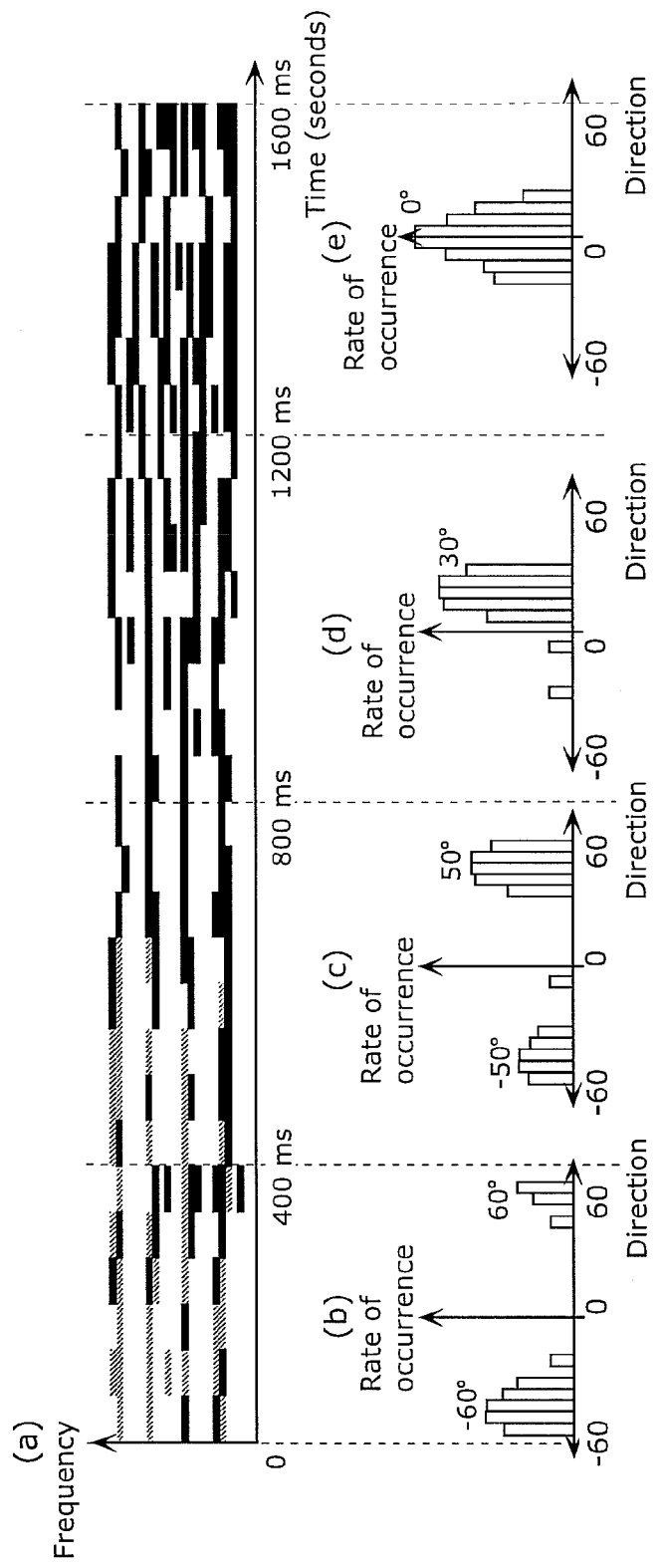
FIG. 8 is a drawing explaining the reflection determination and vehicle direction identification process as performed by the vehicle direction identification unit according to either the first or second embodiment.

FIG. 8 is a drawing explaining the reflection determination and vehicle direction identification process as performed by the vehicle direction identification unit 106.

Similar to (a) in FIG. 5, (a) in FIG. 8 shows a result of the sound source direction identification unit 104 identifying a sound source direction for each analysis section. Moreover, similar to (b) through (e) in FIG. 5, (b) through (e) in FIG. 8 each show a histogram of the rates of occurrence for the sound source directions with respect to the vehicle sound obtained in a 400 ms time period.

The vehicle direction identification unit 106 calculates, for each predetermined time period, the sound source directions and the rates of occurrence.

For example, the frequency band used for vehicle direction identification is set from 50 Hz to 350 Hz, the analysis sections are specified in intervals of 5 Hz with respect to frequency and 40 ms with respect to time. This yields a total of 600 analysis sections in the 400 ms time period (600=(350−50)/5×400/40).

(b) in FIG. 8 is a histogram showing the rates of occurrence for the sound source directions with respect to the vehicle sound shown in (a) in FIG. 8 obtained by the vehicle sound detection microphone 101 and 102 from 0 ms to 400 ms.

Next, the vehicle direction identification unit 106 checks the reflection information and determines whether or not the calculated rates of occurrence correspond to any of the reflection patterns. For example, assume that in (b) in FIG. 8 the rates of occurrence at 60 degrees to the left (−60 degrees) (±15 degrees) total 500. Additionally, assume that the rates of occurrence at 60 degrees to the right (±15 degrees) total 100. In this case, the conditions of the first state in the reflection pattern 2 are met from among the reflection information shown in FIG. 7A.

Next the vehicle direction identification unit 106 calculates the rates of occurrence for the sound source directions with respect to the vehicle sound obtained from 400 ms to 800 ms. (c) in FIG. 8 is a histogram showing the rates of occurrence for the directions from 400 ms to 800 ms. Next, the vehicle direction identification unit 106 checks the reflection information and determines whether or not the calculated rates of occurrence correspond to the second state in the reflection pattern 2. For example, assume that in (c) in FIG. 8 the rates of occurrence at 60 degrees to the left (−60 degrees) (±15 degrees) total 300. Moreover, assume that the rates of occurrence at 60 degrees to the right (±15 degrees) total 300. In this case, the conditions of the second state in the reflection pattern 2 are met upon checking the reflection information shown in FIG. 7A. In other words, the vehicle direction identification unit 106 determines that the change over time of the rate of occurrence distribution of the vehicle sound is the same as shown in the transition from the first state to the second state in the reflection pattern 2.

Since this reflection pattern states that the vehicle is to the right of the user vehicle, it is possible for the vehicle direction identification unit 106 to determine that the vehicle is present to the right of the user vehicle.

The display information storage unit 107 stores information relating to the display mode used when the presence of the vehicle is displayed on the vehicle display unit 109 by the display control unit 108. That is, the display information storage unit 107 stores a plurality of display modes for identifying a manner in which the vehicle is to be represented on the vehicle display unit 109.

Figure 9A:
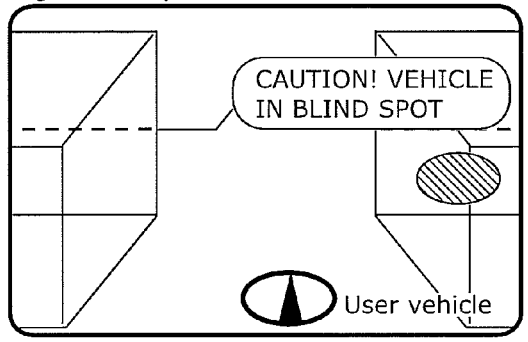
FIG. 9A is a first drawing showing an example of a display mode according to either the first or second embodiment.

FIG. 9A is an example of a display that the display control unit 108 displays on the vehicle display unit 109 when the vehicle direction identification unit 106 determines that reflected sound is coming from a vehicle that is present to the right in a blind spot shielded by a barrier. The vehicle is shown as a circle filled with diagonal lines behind the barrier to the right of the user vehicle which is approaching the traffic intersection. Additionally, a warning message such as "CAUTION! VEHICLE IN BLIND SPOT" is displayed to warn the user.

Figure 9B:
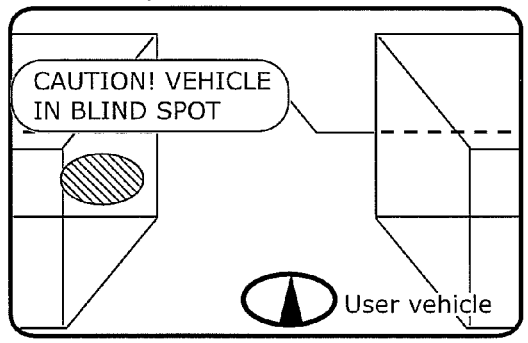
FIG. 9B is a second drawing showing an example of a display mode according to either the first or second embodiment.

FIG. 9B is an example of a display that the display control unit 108 displays on the vehicle display unit 109 when the vehicle direction identification unit 106 determines that a vehicle is present to the left of the user vehicle. The vehicle is shown as a circle filled with diagonal lines behind the barrier to the left of the user vehicle which is approaching the traffic intersection. Additionally, a warning message such as "CAUTION! VEHICLE IN BLIND SPOT" is displayed to warn the user.

Figure 9C:
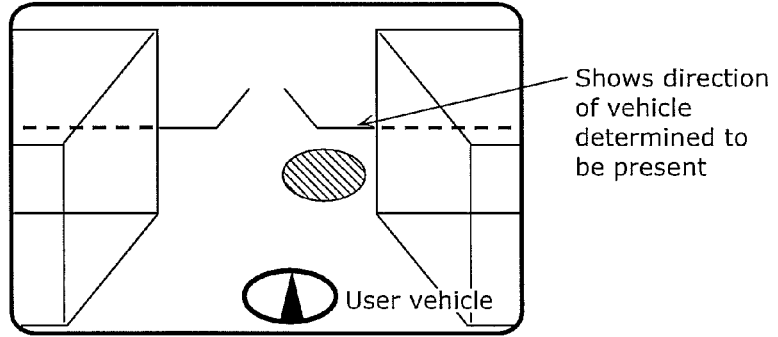
FIG. 9C is a third drawing showing an example of a display mode according to either the first or second embodiment.

FIG. 9C is an example of a display that the display control unit 108 displays on the vehicle display unit 109 when the vehicle direction identification unit 106 determines that the vehicle sound is not reflected sound and identifies, for example from the arrival time difference of the sound, that there is one direction in which the vehicle is present. Here, when it is determined by the vehicle direction identification unit 106 that the vehicle sound is not reflected sound, it can be assumed that the direction in which the vehicle is present is not a blind spot. For this reason, the display control unit 108 may use a display mode which does not display a warning message on the vehicle display unit 109. That is, the display control unit 108 may cause the vehicle display unit 109 to display the vehicle (i) using a first display mode included in the plurality of display modes when the vehicle direction identification unit 106 determines that the vehicle sound is reflected sound, and (ii) using a second display mode which is included in the plurality of display modes and is different from the first display mode when the vehicle direction identification unit 106 determines that the vehicle sound is not reflected sound. Specifically, the display control unit 108 may switch which display mode to use when (i) the display shown in FIG. 9A or FIG. 9B in which reflected sound is detected is displayed, and (ii) the display shown in FIG. 9C in which reflected sound is not detected is displayed. As a result, the vehicle direction identification system 120 can display a display which is more suited to the driving environment of the user.

It is to be noted that the display control unit 108 may use a display mode which displays an image of a vehicle in the direction identified rather than a circle filled with diagonal lines.

The display control unit 108 controls the display by selecting display information stored in the display information storage unit 107 according to the determination by the vehicle direction identification unit 106 of whether the vehicle sound is reflected sound or not. That is, the display control unit 108 can cause the vehicle display unit 109 to display a different display by changing the display mode depending on whether the vehicle sound is reflected sound or not.

The vehicle display unit 109 is, for example, a screen (liquid crystal display) on a car navigation system or a mobile communications device which shows the direction in which the vehicle is present as identified by the vehicle direction identification device 110.

For example, refer to FIG. 9A through FIG. 9D and consider that the vehicle direction identification unit 106 determines that the vehicle sound is reflected sound and identifies the vehicle as being to the right of the user vehicle. The display control unit 108 selects the display mode which displays an image showing a vehicle in the blind spot to the right (right blind spot mode) along with a warning message, and displays a screen similar to the one shown in FIG. 9A on the vehicle display unit 109.

On the other hand, when the vehicle direction identification unit 106 determines that the vehicle sound is reflected sound and identifies the vehicle as being to the left of the user vehicle, the display control unit 108 selects the display mode which displays an image showing a vehicle in the blind spot to the left (left blind spot mode) along with a warning message, and displays a screen similar to the one shown in FIG. 9B on the vehicle display unit 109.

Moreover, when the vehicle sound does not match any of the reflection patterns and the vehicle direction identification unit 106 identifies the direction in which the vehicle is present, the display control unit 108 selects the display mode which displays an image showing the identified direction in which the vehicle is present (direction display mode), and displays a screen similar to the one shown in FIG. 9C on the vehicle display unit 109.

More specifically, when the rate of occurrence distribution of the vehicle sound obtained from 0 ms to 400 ms is the first state and the rate of occurrence distribution of the vehicle sound obtained from 400 ms to 800 ms is the second state, the vehicle direction identification unit 106 identifies the transition from the first state to the second state as the reflection pattern 2 from among the reflection information shown in FIG. 7A. The reflection pattern 2 is a reflection pattern which states that the vehicle is present to the right of the user vehicle. The display control unit 108 therefore selects the display mode showing that the vehicle is present in the blind spot shielded by a barrier to the right, as is shown in FIG. 9A.

However, after some time has elapsed, the sound source is distributed such that the rate of occurrence is high at 30 degrees to the right from 800 ms to 1200 ms. Since the vehicle is approaching the user vehicle, the influence of direct sound and diffracted sound increases, and the actual direction in which the vehicle is present is calculated and distributed. Moreover, this distribution from 800 ms to 1200 ms does not correspond to any of the reflection patterns. When the direction in which the vehicle is present not from reflection information but from, for example, the arrival time difference of the sound is identified, the display control unit 108 uses, for example, the display mode shown in FIG. 9C to display an image showing the identified direction in which the vehicle is present on the vehicle display unit 109.

Figure 9D:
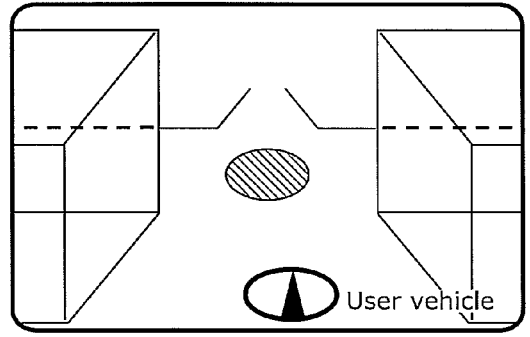
FIG. 9D is a fourth drawing showing an example of a display mode according to either the first or second embodiment.

After time has further elapsed, the sound source is distributed such that the rate of occurrence is high at 0 degrees (center) from 1200 ms to 1600 ms. As shown in FIG. 9D, the display control unit 108 therefore uses the same display mode shown in FIG. 9C to display an image showing the identified direction in which the vehicle is present (for example, near the front of the user vehicle) on the vehicle display unit 109.

Figure 10:
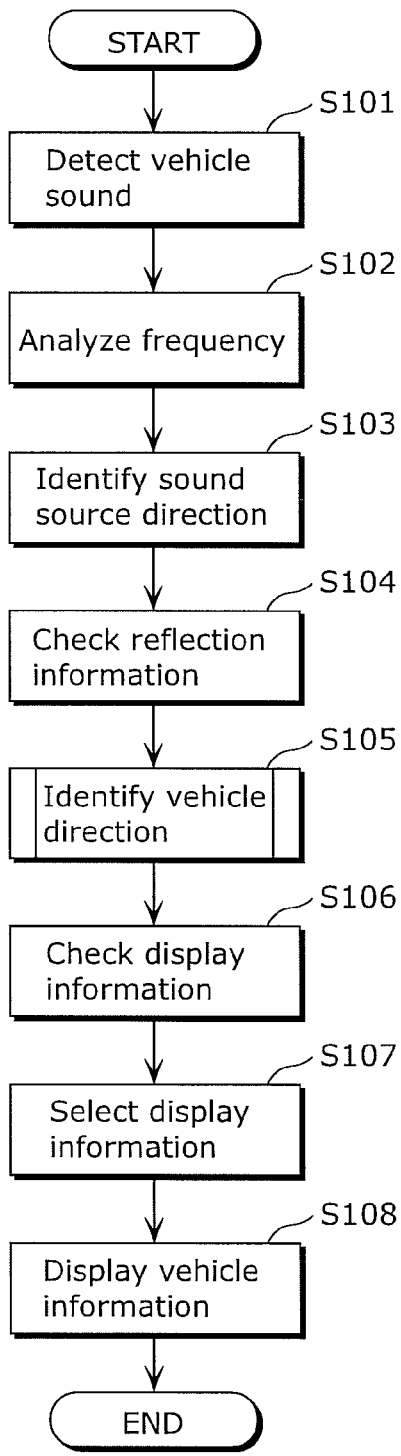
FIG. 10 is a first flow chart illustrating the flow of processes performed by the vehicle direction identification device according to the first embodiment.

Next, operational flow of the vehicle direction identification device 110 according to the first embodiment will be described with reference to FIG. 10 and FIG. 11.

First, vehicle sound is detected by the vehicle sound detection microphone 101 and 102 (step S101).

Next, the detected vehicle sound is obtained and frequency analysis is performed on the vehicle sound by the frequency analysis unit 103 (step S102). Then the sound source direction for each analysis section is identified by the sound source direction identification unit 104 based on the sound arrival time difference (step S103).

Next, the vehicle direction identification unit 106 checks the reflection information stored in the reflection information storage unit 105 (step S104). Then, using the information of the sound source directions identified in step S103, the vehicle direction identification unit 106 determines whether the vehicle sound is reflected sound or not, and furthermore identifies the direction in which the vehicle is present (step S105).

Figure 11:
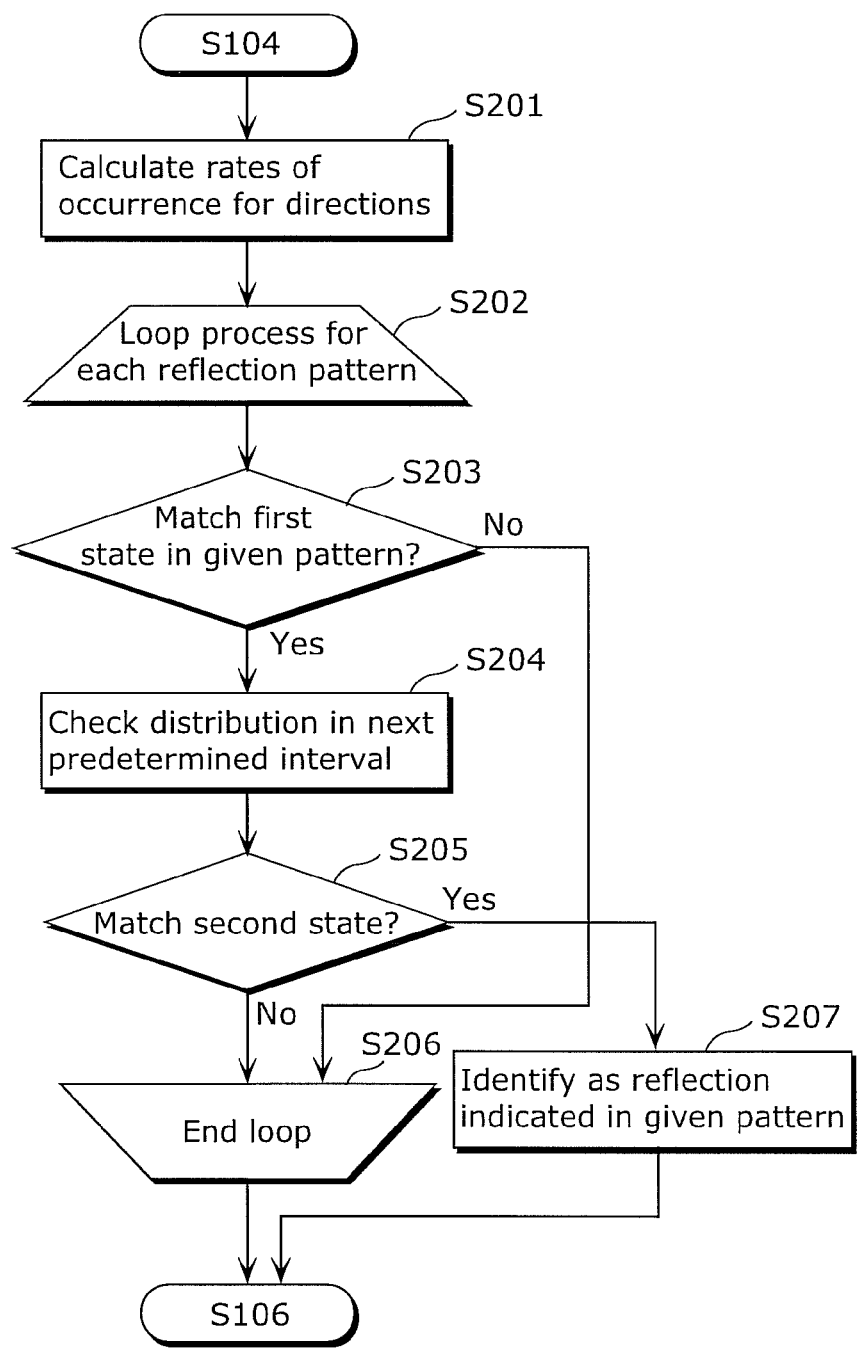
FIG. 11 is a second flow chart illustrating the flow of processes performed by the vehicle direction identification device according to the first and second embodiments.

FIG. 11 illustrates step S105 in detail.

The vehicle direction identification unit 106 first calculates the rate of occurrence for each sound source direction (step S201). For example, the rate of occurrence (as well as the rate of occurrence distribution) for each sound source direction such as is shown in (b) in FIG. 8 is calculated.

Next the vehicle direction identification unit 106 repeats (loops) this process for each reflection pattern included in the reflection information (step S202), and determines whether the distribution of the sound source directions corresponds with the first state in a given reflection pattern or not (step S203).

That is, the vehicle direction identification unit 106 selects one of the reflection patterns from the plurality of reflection patterns stored in the reflection information storage unit 105, and repeats (loops) the process described below for each reflection pattern (step S202).

To explain in more detail, the vehicle direction identification unit 106 determines whether or not the rate of occurrence distribution for the sound source directions meets the conditions set forth as the first state in the selected reflection pattern (step S203).

If the rate of occurrence distribution for the sound source directions meets the conditions set forth as the first state in the selected reflection pattern (YES in step S203), the vehicle direction identification unit 106 checks the rate of occurrence distribution for the vehicle sound obtained in a subsequent predetermined time period (for example, 400 ms) (step S204). Next, the vehicle direction identification unit 106 determines whether or not the rate of occurrence distribution for the sound source directions meets the conditions set forth in the second state in the selected reflection pattern (step S205). That is, the vehicle direction identification unit 106 checks if the change in the rate of occurrence distribution over time matches with the state transition model shown as the reflection pattern.

Once again, if the rate of occurrence distribution meets the conditions set forth as the second state in the selected reflection pattern (YES in step S205), the vehicle direction identification unit 106 identifies that the vehicle sound is the reflected sound shown in the selected reflection pattern (step S207). Moreover, the direction in which the vehicle is present is identified as the estimated vehicle direction included in the selected reflection pattern.

On the other hand, if the rate of occurrence distribution does not meet the conditions set forth as the first state in the selected reflection pattern (NO in step S203), or the conditions set forth as the second state (NO in step S205), the vehicle direction identification unit 106 selects the next, different reflection pattern stored in the reflection information storage unit 105, and repeats (loops) the same processes (step S206).

Figure 7B:
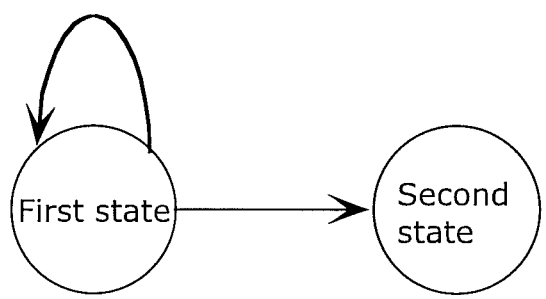
FIG. 7B shows an example of state transition showing a reflection pattern according to either the first or second embodiment.

It is to be noted that what is being explained here is the checking of the actual change in the rate of occurrence distribution over time against the transition from the first state to the second state as performed by vehicle direction identification unit 106. However, it is acceptable if the actual change in the rate of occurrence distribution over time is checked against a reflection pattern that is a state transition model which includes a self-transition, such as one in which the loop is performed on the first state a given number of times before transitioning to the second state, as is shown in FIG. 7B.

Next, the display control unit 108 refers to the display modes stored in the display information storage unit 107 (step S106) and selects a display mode (step S107). Lastly, the vehicle display unit 109 displays the vehicle information using the selected display mode (step S108).

It is to be noted that, in the first embodiment, when the rate of occurrence distribution conforms with a state transition model that transitions from a first state to a second state included in a reflection pattern, the vehicle direction identification device 110 displays the presence of the vehicle to the user. For example, when the rate of occurrence distribution of the vehicle sound corresponds with a state transition model identified as the reflection pattern 2 shown in FIG. 7A, the vehicle direction identification device 110 displays that the vehicle is present in the blind spot to the right, as is shown in FIG. 9A.

In this manner, the vehicle direction identification device 110 can perform matching with great accuracy in a situation in which reflected sound comes from a blind corner shielded by a barrier at, for example, a traffic intersection, by determining whether or not the rate of occurrence distribution conforms with two states, such as the transition from the first state to the second state. However, the display method is not limited to the examples previously described. The vehicle direction identification device 110 may, for example, display the vehicle position with respect to the user or a message at the point in time the rate of occurrence distribution conforms with the first state.

Figure 12:
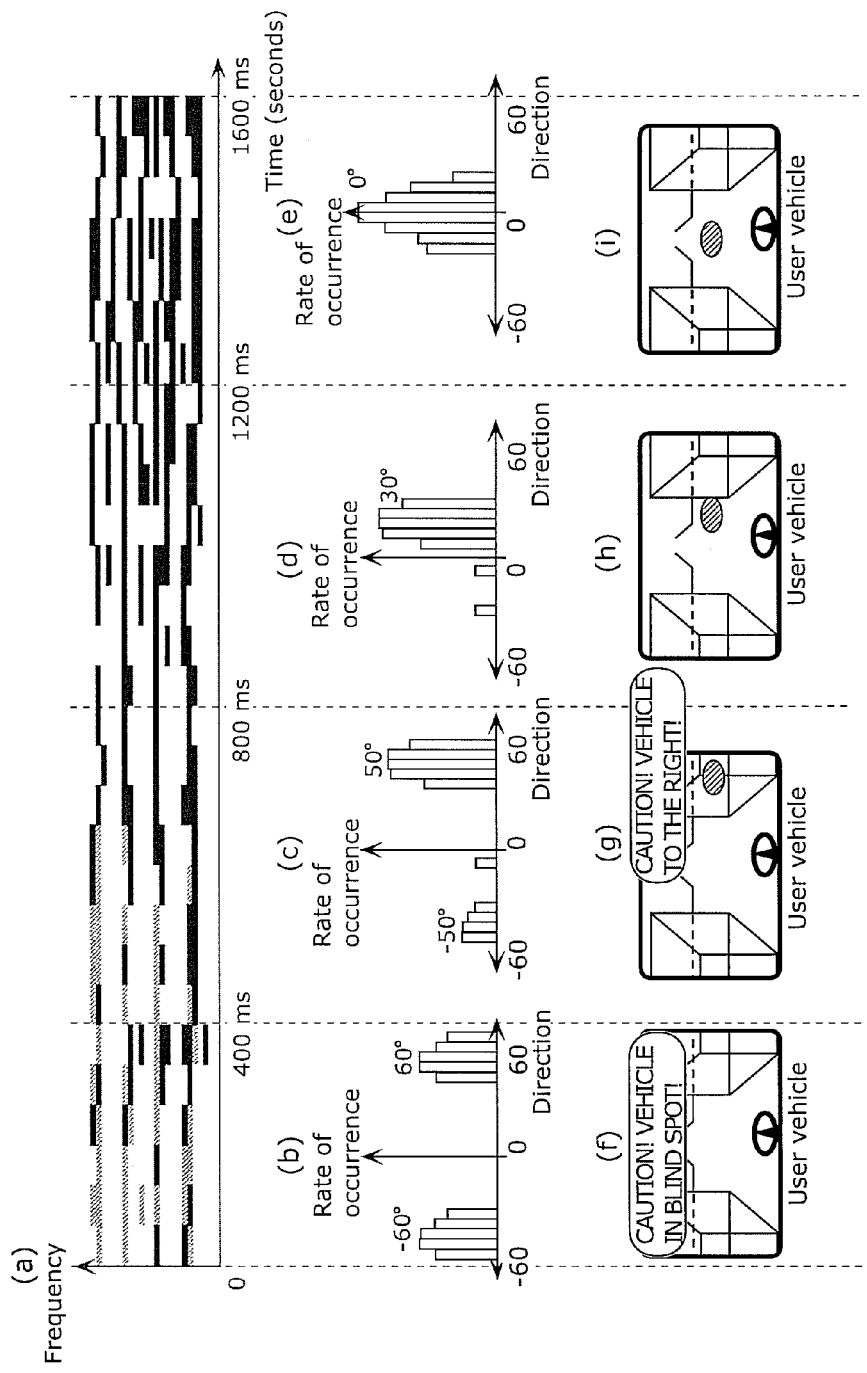
FIG. 12 is a second drawing showing an example of another relationship of the correspondence between the identified direction and the display by the vehicle display unit, according to either the first or second embodiment.

FIG. 12 shows an example of another relationship of the correspondence between the identified direction and the display by the vehicle display unit. Similar to (a) in FIG. 5, (a) in FIG. 12 shows a result of the analysis of the direction of a sound source for each analysis section. (b) in FIG. 12 shows a histogram of the rates of occurrence for the sound source directions with respect to the vehicle sound obtained from 0 ms to 400 ms. Here, assume that the rates of occurrence at 60 degrees to the left (−60 degrees) (±15 degrees) total 300. Moreover, assume that the rates of occurrence at 60 degrees to the right (±15 degrees) total 300. In this case, from among the reflection information shown in FIG. 7A, the conditions of the first state in the reflection pattern 4 and the first state in the reflection pattern 3 are met.

Next the vehicle direction identification unit 106 calculates the rates of occurrence for the sound source directions from 400 ms to 800 ms. (c) in FIG. 12 shows a histogram of the rates of occurrences for the sound source directions from 400 ms to 800 ms. Next, the vehicle direction identification unit 106 checks the reflection information and determines whether or not the rate of occurrence distribution for the sound source directions corresponds to any of the reflection patterns. For example, assume that in (c) in FIG. 12 the rates of occurrence at 60 degrees to the left (−60 degrees) (±15 degrees) total 100. Moreover, assume that the rates of occurrence at 60 degrees to the right (±15 degrees) total 500. In this case, the conditions of the second state in the reflection pattern 4 are met from among the reflection information shown in FIG. 7A. In other words, it is determined that the rate of occurrence distribution is the same as the transition from the first state to the second state expressed in the reflection pattern 4.

Since this reflection pattern states that the vehicle is to the right of the user vehicle, it is possible for the vehicle direction identification unit 106 to determine that the vehicle is present to the right of the user vehicle. As a result, the vehicle is displayed on the vehicle display unit 109 as being to the right of the user vehicle, as shown in (g) in FIG. 12.

However, in FIG. 12, the vehicle display unit 109 displays that a vehicle is present in a blind spot, as is shown in (f) in FIG. 12, at the point in time the rate of occurrence distribution conforms with the first state in the reflection pattern. At traffic intersections, for example, in which visibility to the left and right is shielded by barriers, vehicle sound is also detected in a direction opposite that of the actual vehicle, as is shown in (b) in FIG. 12. As is shown in (c) in FIG. 12, by checking the change in rates of occurrence over predetermined time periods, the vehicle direction identification device 110 can identify the actual direction in which the vehicle is present.

On the other hand, as is shown in (b) in FIG. 12, when the change over predetermined time periods is not checked, it is often difficult to identify the actual direction in which the vehicle is present at this point. For example, in the case of the distribution shown in (b) in FIG. 12, the distribution corresponds with the first state in the reflection pattern 3 and the first state in the reflection pattern 4. Thus, according to which rates of occurrence increase next, it is possible to determine whether the vehicle is to the right or to the left. However, since a vehicle is present and the rates of occurrence correspond to a reflection pattern, it is acceptable for the vehicle direction identification device 110 to notify the user at the point in time the rates of occurrence match the first state. This is effective as a precautionary measure which can assist in making driving safer.

Moreover, it is not absolutely necessary for the vehicle display unit 109 to continuously display the vehicle. It is possible for the display control unit 108 to assist in making driving safer for the driver by varying between display or non-display, or varying the manner of the display according to the needs of the driver.

For example, it is often necessary to notify the driver especially in instances in which the vehicle is present in a blind spot shielded by a barrier. However, some drivers may find it not necessary to be notified in instances in which the vehicle is already in front of the user vehicle or close enough to the user vehicle that direct sound can arrives. For that reason, the display control unit 108 may control the display by, for example, display a notification on the vehicle display unit 109 when sound corresponds to the reflection information, and not displaying a notification when sound does not correspond to the reflection information.

Regarding determining the extent of arrival of direct sound, sound pressure threshold values may be set in place, and microphones may fitted inside the cabin of the vehicle and determined by the display control unit 108.

Figure 13:
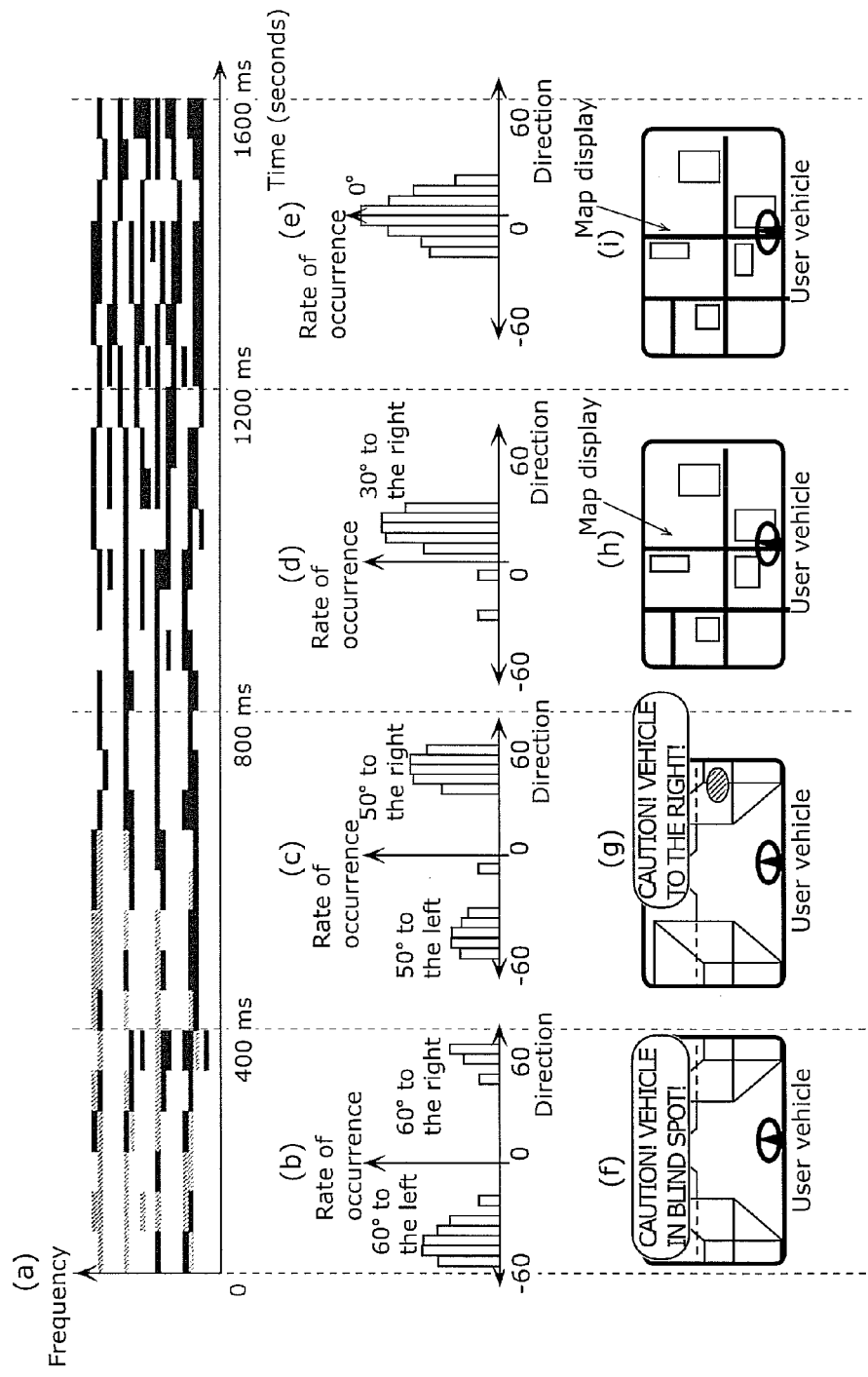
FIG. 13 is a third drawing showing an example of yet another relationship of the correspondence between the identified direction and the display by the vehicle display unit, according to either the first or second embodiment.

FIG. 13 takes place in the same setting as FIG. 12 and shows an example of yet another relationship of the correspondence between the identified direction and the display by the vehicle display unit. Similar to (b) and (c) in FIG. 12, the vehicle direction identification unit 106 can determine that the vehicle is present to the right of the user vehicle and that reflected vehicle sound is coming from a barrier to the side of the user vehicle from the change over time (transition) in the distribution between 0 ms and 400 ms to the distribution between 400 ms and 800 ms. At this time, as is shown in (f) and (g) in FIG. 13, the presence of the vehicle and the presence of the vehicle to the right of the user vehicle is displayed to the driver on the vehicle display unit 109.

On the other hand, after time has further passed, when rate of occurrence distributions as shown in (d) and (e) in FIG. 13 are calculated, the vehicle direction identification unit 106 determines that the vehicle is at 30 degrees to the right, and then comes to the front of the user vehicle to 0 degrees center. Here, in contrast to the display shown in FIG. 12, the display control unit 108 may display a map and the position of the user vehicle as is shown in (h) and (i) in FIG. 13.

In other words, the display control unit 108 causes the vehicle display unit 109 to display, as shown in (h) in FIG. 13, the position of the user vehicle in a map mode on a regular basis. However, when the vehicle direction identification unit 106 determines that a vehicle is in a blind spot shielded by a barrier, the display mode of the vehicle display unit 109 may be switched to display the presence of a vehicle such as in (f) and (g) in FIG. 13.

There are some drivers who prefer not to be notified of being excessively close to another vehicle or being notified for a considerable length of time. For that reason, as exemplified in the first embodiment, the user is only notified of the presence or proximity of a vehicle when detected, and, for example, the usual mode in which a map is display is returned to thereafter. This allows for a notification system which accommodates a wide range of drivers.

It is to be noted that there are instances in which the rates of occurrence of the vehicle match the first state in the reflection pattern 1 but not the second state, and additionally match the first state in the reflection pattern 2 but not the second state.

This pattern occurs often when the vehicle having already passed by the front of the user vehicle has faded into the distance. For example, the rates of occurrence do not match the second state in the reflection pattern 1 because the vehicle passed the front of the vehicle, vehicle sound from the vehicle to the right was reflected, and the vehicle faded into the distance.

In this case, since the rates of occurrence do not match the reflection pattern 1, the vehicle display unit 109 does not display the presence of the vehicle. As previously stated, this is because there are some drivers who prefer not to be notified of being excessively close to another vehicle or being notified for a considerable length of time. In this case, the user is only notified of the presence or proximity of a vehicle when detected, not of a vehicle which has already passed or a vehicle which is not nearby but is fading into the distance. This allows for a notification system which accommodates a wide range of drivers.

However, when the user wishes for a vehicle which has already passed to be displayed, a special reflection pattern which accommodates a situation in which the vehicle is fading into the distance may be included in the reflection information storage unit 105, and according to the result of a determination by the vehicle direction identification unit 106, the vehicle direction identification unit 106 may control the displaying done by the vehicle display unit 109.

Regarding the state transition in a reflection pattern according to the first embodiment, it is to be noted that there is also case in which, for example, the rates of occurrence for a vehicle repeatedly match the first state for a length of time as a result of the distance of the vehicle, then transitions to the second state. In other words, the rates of occurrence over a plurality of time periods match the first state, the first state again, then the second state. In this case, as previously stated, since the reflection pattern includes a self-transition as shown in FIG. 7B, the reflection pattern may include a steady-state which repeats a given state.

Moreover, while each reflection pattern was described as including two states in the first embodiment, the number of states is not limited thereto, and a reflection pattern may contain, for example, three states. The amount of processing (matching) required of the vehicle direction identification device 110 increases with the number of states included. However, by storing reflection patterns which accurately reflect a change over time in actual rate of occurrence distributions in the reflection information storage unit 105, the vehicle direction identification device 110 can more accurately identify the direction in which the vehicle is present.

Moreover, according to the first embodiment, in each state, the rates of occurrence for each direction included in the reflection pattern are included as a count (that is, an absolute expression). However, the rates of occurrence may be included as an amount of difference between the first state and the second state (that is, a relative expression based on the first state). Moreover, the rates of occurrence may expressed as a reflection model as a proportion of the rates of occurrence for the direction in which the vehicle is present to the rates of occurrence for the direction opposite that in which the vehicle is present. The sound pressure of vehicle sound arriving from a vehicle sometimes differs from vehicle to vehicle. However, since the plurality of transition reflection patterns include the same trends, the sound pressures can be aggregated by expressing them as a proportion. Consequently, the vehicle direction identification unit 106 can determine if vehicle sound is reflected sound with increased accuracy in some cases.

Moreover, each of the plurality of reflection patterns may include direction information and rate of occurrence information which are different for each frequency band. Particularly in the case of vehicle sound, engine sound generally appears in the low frequency band, such as within the 50 Hz to 350 Hz range. Furthermore, engine sound has a harmonic structure. On the other hand, tire sound appears in a relatively high frequency band, such as within the 700 Hz to 1000 Hz range. Tire sound generally appears throughout the frequency. It therefore becomes possible for the vehicle direction identification unit 106 to identify vehicle sound with accuracy by providing the reflection information with reflection patterns for each frequency band and providing rate of occurrence threshold values that vary between reflection patterns. Moreover, the influence reflection has increases with frequency. As a result, weighting is acceptable such that greater influence is given to the change in rates of occurrence or transition the higher the sound frequency.

Moreover, the sound pressure of engine sound and tire sound are different, and the distance at which engine sound and tire sound can be detected is different. Consequently, it is acceptable to individually establish sound pressure threshold values for engine sound and tire sound. That is, because the frequency of tire sound generally tends to be greater than engine sound, the rate of occurrence of tire sound tends to be greater. As a result, it is acceptable for a sound pressure (amplitude) threshold value to be set higher for higher frequencies, and it is acceptable for the sound source direction identification unit 104 to determine whether or not the amplitude of the vehicle sound is less than the sound pressure threshold value for each analysis section. Here, if the amplitude is less than the threshold value, it is conceivable that the sound source direction identification unit 104 will remove that analysis section from the vehicle sound to be used for identifying the vehicle direction, so that that analysis section does not apply to the identification of the vehicle direction.

That is, it is acceptable for the sound source direction identification unit 104 to determine whether or not the amplitude of the vehicle sound is less than the threshold value which is a sound pressure threshold value, for each analysis section. If the result is that the amplitude is less than the sound pressure threshold value, that analysis section does not apply to the identification of the vehicle direction. The sound pressure threshold value can, for example, be set higher for analysis sections having a higher frequency.

At any rate, the vehicle direction identification device 110 according to the first embodiment identifies the direction in which a vehicle is present from two peaks in the rate of occurrence distribution as a result of the vehicle sound being reflected, one at the direction in which the vehicle is actually present, and one at the opposite direction. Consequently, it is acceptable as long as the reflection pattern, which indicates a transition in the rate of occurrence distribution with respect to the vehicle direction and the direction of travel of the vehicle, is stored as reflection information. The reflection pattern is not limited to the examples disclosed in the first embodiment. Any embodiment which reflects the technical ideas described above falls within the scope of the present disclosure.

Embodiment 2

In the first embodiment, a technique for displaying necessary information to the user by determining whether vehicle sound is reflected sound or not using sound detected from a direction opposite that of the actual vehicle as a result of being reflected, and by identifying the position of the vehicle was explained. Furthermore, in the second embodiment, for each predetermined frequency, sound detected as coming from a direction opposite that of the actual vehicle is detected, the sound is determined to be reflected sound or otherwise, and a position of the vehicle is determined.

Figure 14:
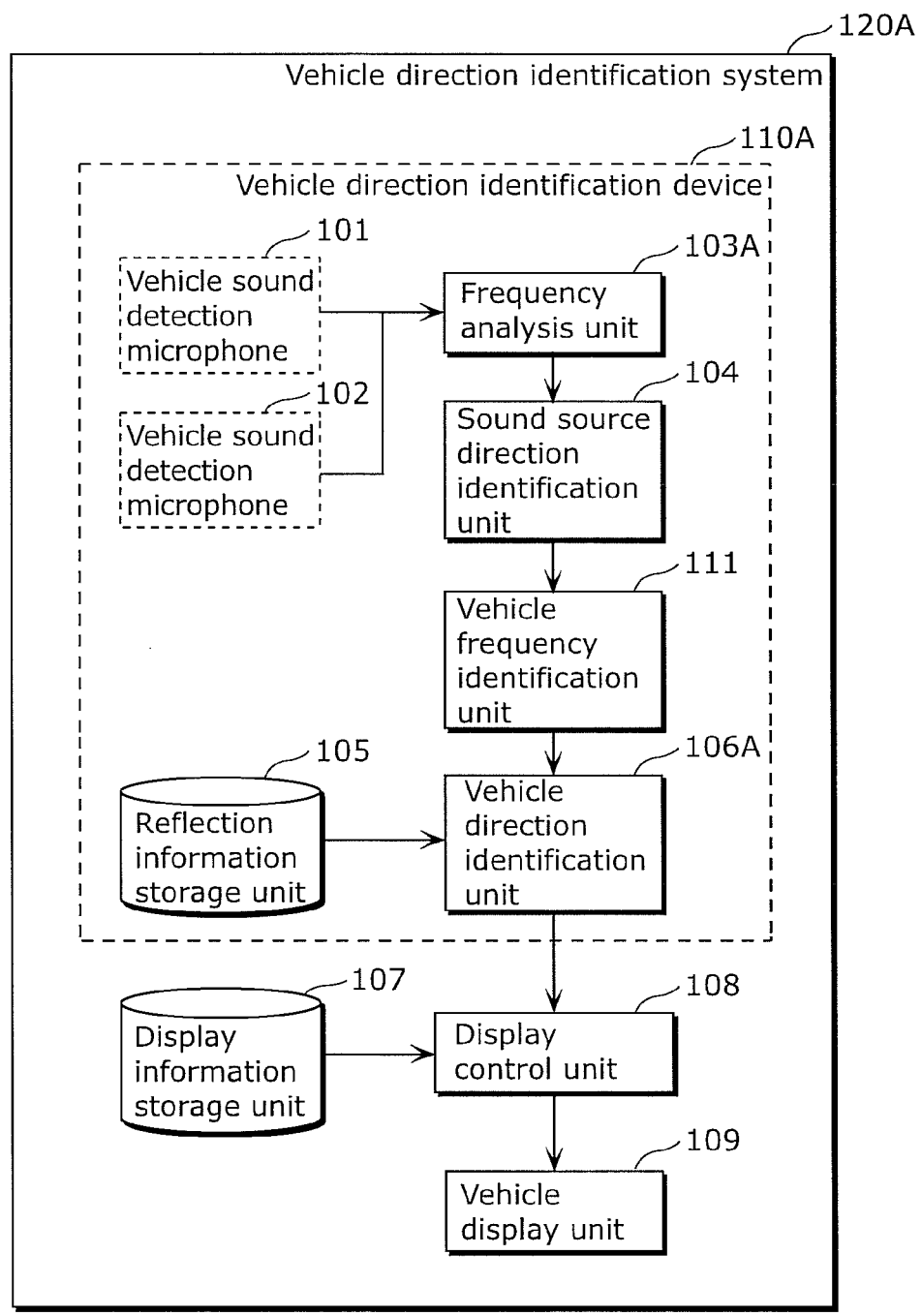
FIG. 14 is a block diagram showing a configuration of a vehicle direction identification system according to the second embodiment.

FIG. 14 shows a configuration of a vehicle direction identification system 120A including a vehicle direction identification device 110A according to the second embodiment of the present disclosure. It is to be noted that the constituents which are the same as in FIG. 1 use the same reference numerals and descriptions thereof will be omitted.

A frequency analysis unit 103A analyzes the phase and the amplitude of the vehicle sound in each of the plurality of analysis sections.

The vehicle frequency identification unit 111 identifies given reference frequency bands for the vehicle sound based on analysis information from the sound source direction identification unit 104 for each of the analysis sections specified by the predetermined frequencies and predetermined time intervals.

That is, the vehicle frequency identification unit 111 identifies, as an N-th reference frequency, a representative value that represents a frequency corresponding to an analysis section having an N-th highest amplitude among the plurality of analysis sections in a corresponding one of the time intervals, and identifies, as an N-th reference frequency band, a frequency band having a predetermined range centered on the N-th reference frequency.

a vehicle direction identification unit 106A identifies the direction in which the vehicle is present by checking a plurality of sound source directions corresponding to the analysis sections included in the N-th reference frequency band against the reflection information.

This will be explained further below with reference to the Drawings.

Figure 15:
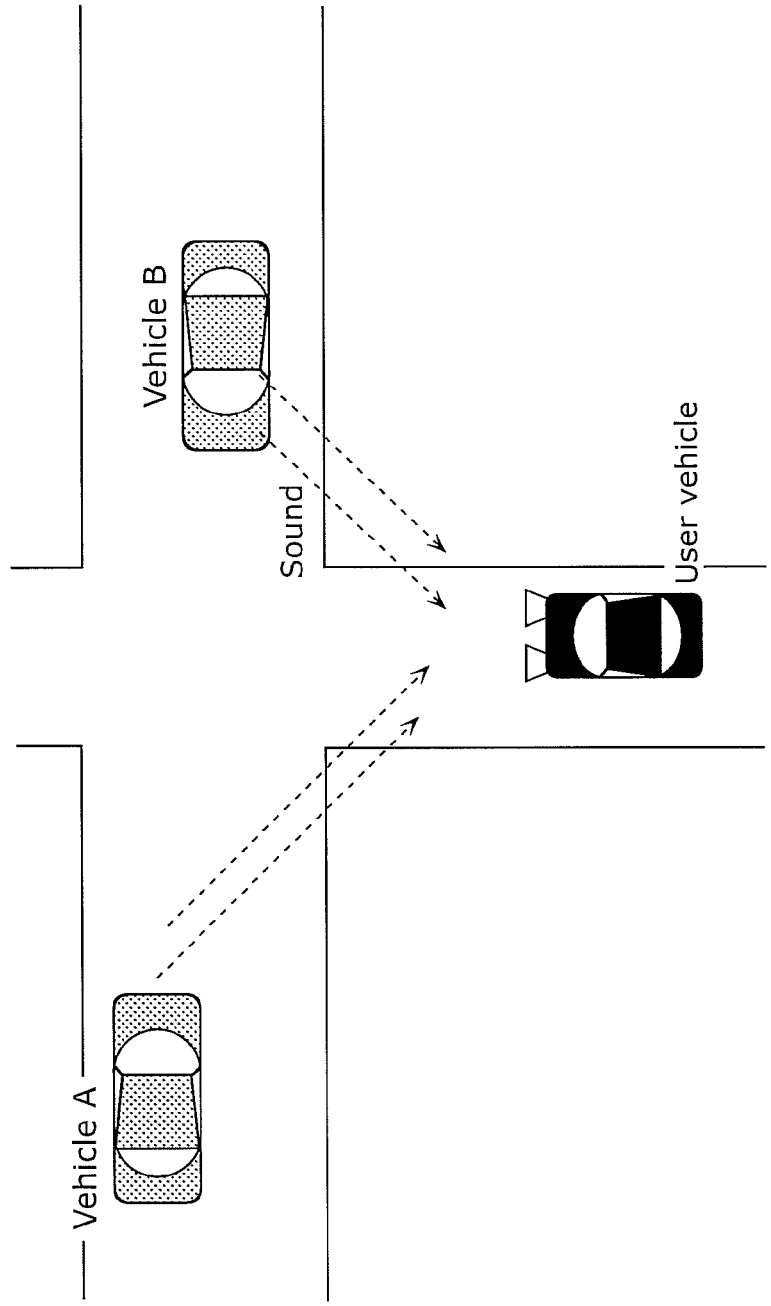
FIG. 15 is a drawing explaining the positional relationship of vehicles according to the second embodiment.

FIG. 15 shows the implicit positional relationship of vehicles in the second embodiment. Two vehicles are present, one to the left and one to the right of the user vehicle. In the first embodiment, an example was given in which a single vehicle was present in a blind spot shielded by a barrier to the right of the user vehicle. Specifically, as is shown in FIG. 4, when a vehicle is present to the right, a phenomenon occurs in which sound is detected from both sides due to sound arriving directly from the right and sound arriving after being reflected off the barrier to the left. In this situation, the vehicle direction identification device 110 according to the first embodiment, via the vehicle direction identification unit 106, determines whether the vehicle sound is reflected sound or not and identifies the vehicle direction using reflection information.

However, as is shown in FIG. 15, even when there are no barriers present, that is, even when in an environment in which influence from reflections is low, when two cars are present to the left and right, vehicle sound is detected from both the left and right. As a result, there are instances in which the vehicle direction identification device 110 according to the first embodiment cannot determine whether the vehicle sound is reflected sound or not. Therefore, the vehicle direction identification device 110A according to the second embodiment differentiates whether vehicle sound is sound from a single vehicle which has been reflected, or sound from two vehicles which are actually present on either side of the user vehicle as is shown in FIG. 15, by specifying given reference frequency bands for the vehicle sound via the vehicle frequency identification unit 111.

Figure 16:
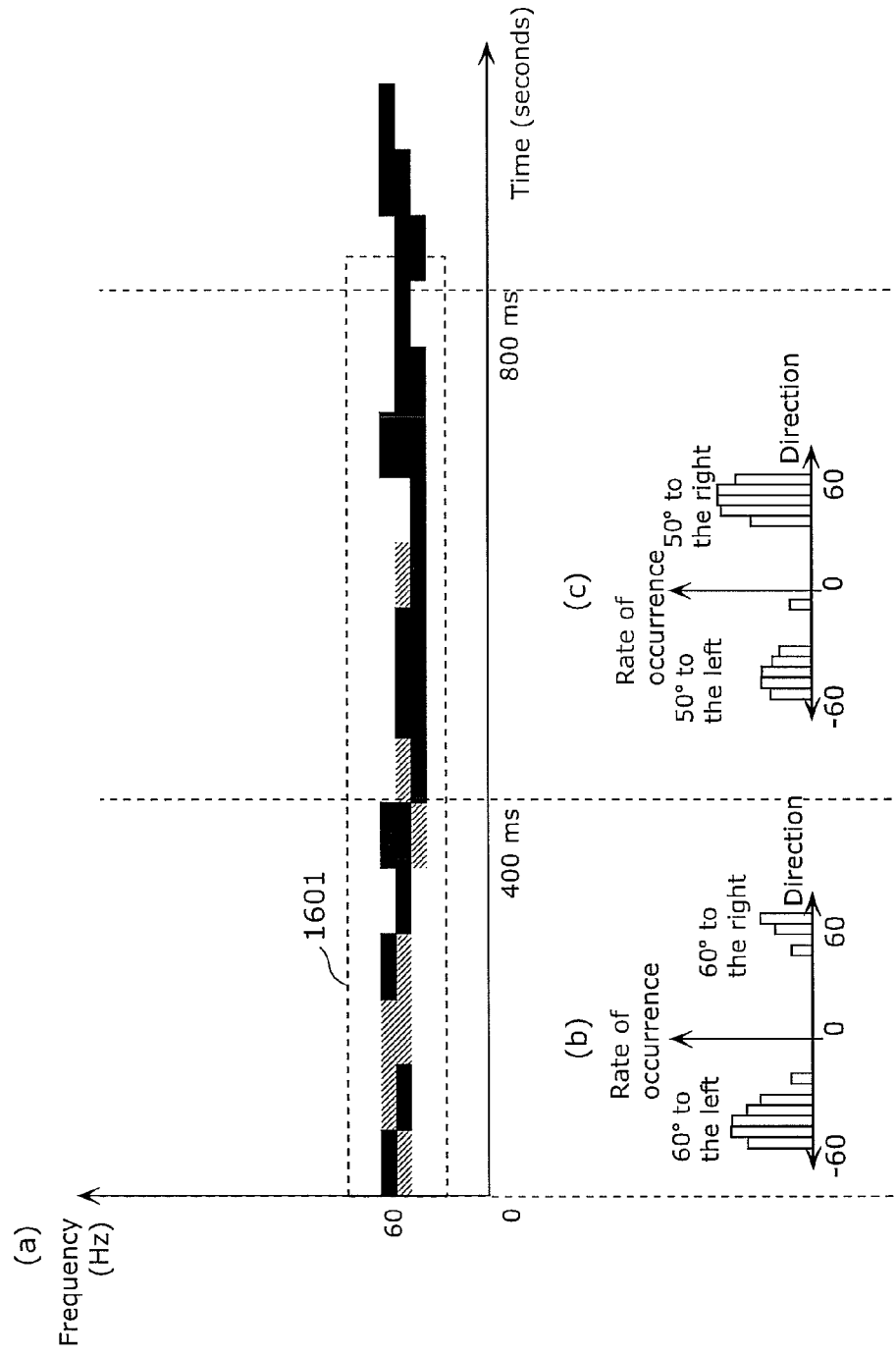
FIG. 16 is a first drawing explaining the sound source directions according to the second embodiment.

FIG. 16 shows the direction of a piece of sound source in each predetermined frequency and time interval. Specifically, (a) in FIG. 16 shows a result of the sound source direction identification unit 104 identifying a sound source direction for each analysis section in a situation in which a single vehicle is present in a blind spot shielded by a barrier to the right, similar to FIG. 4. Here, the vertical axis represents frequency, and the horizontal axis represents time. It is to be noted that only the sound source directions corresponding to a low frequency band 1601 are shown, such as those between 0 Hz and 100 Hz. The sections colored solid black represent the sections for which a direction to the right is calculated, while the sections colored with diagonal black lines represent sections for which a direction to the left as a result of reflection is calculated.

Here, vehicle sound is sound emanating from the engine vibrating rhythmically. As such, the sound has a specific frequency component, similar to a sine wave.

For example, by referring to (a) in FIG. 16, it can be seen that vehicle sound of a given sound pressure is emanating at 60 Hz. Moreover, this sound includes reflected sound arriving from the left and direct sound arriving from the right, and as such, directions are calculated both to the right and the left in the 60 Hz frequency band.

The vehicle frequency identification unit 111 identifies reference frequency bands for the vehicle sound based on the analysis information (that is, the amplitude and sound source direction for each analysis section) for each analysis section in the frequency analysis unit 103A and the sound source direction identification unit 104 with the procedures described below.

First, the vehicle frequency identification unit 111 identifies the frequency of the analysis section having the highest sound pressure (that is, the highest amplitude) from among the analysis sections for which a sound source direction has been identified (for example, the analysis sections colored solid black and colored with black diagonal lines in (a) in FIG. 16) as a reference frequency.

Here, the phrase "the frequency of the analysis section having the highest sound pressure (that is, the highest amplitude)" can be considered as, for example, the frequency corresponding to the analysis section in each time interval having the highest amplitude. This frequency is identified as a representative value (for example, an average value or the median), and covers every time interval. Moreover, this parameter is not limited to the "highest" amplitude. A representative value of the frequency corresponding to the analysis section having the N-th highest amplitude (where N=1, 2, 3 . . . ) may be identified as the N-th reference frequency, wherein the representative value covers every time interval. N may be, for example, the number of vehicles identified, or double the number of vehicles in order to accommodate a situation in which the vehicle sound is harmonic. Here, as is shown in FIG. 16, the reference frequency is identified to be 60 Hz.

Next, the vehicle frequency identification unit 111 identifies a range having an acceptable breadth centered on the 60 Hz reference frequency (for example, plus-minus (±) 5 Hz) as a reference frequency band.

Next, the vehicle direction identification unit 106A calculates, for the vehicle sound included in the reference frequency band, the rate of occurrence distribution for the sound source directions in a predetermined time interval, determines whether the vehicle sound is reflected sound or not based on the variation over time in the rate of occurrence distribution, and identifies the direction in which the vehicle is present.

It is to be noted that the vehicle frequency identification unit 111 uses an acceptable range of frequencies centered on the reference frequency because, unlike sound from an instrument, the reference frequency of sound from a vehicle gradually changes according to the speed of the vehicle. By setting an acceptable range, tracking becomes relatively simpler even when there is a change in speed.

(b) in FIG. 16 is a rate of occurrence distribution obtained by calculating the distribution of the sound source directions in the time period from 0 ms to 400 ms included in the range from 55 Hz to 65 Hz identified as the reference frequency band.

(c) in FIG. 16 is a rate of occurrence distribution obtained by calculating the distribution of the sound source directions in the time period from 400 ms to 800 ms included in the range from 55 Hz to 65 Hz identified as the reference frequency band. The rate of occurrence distribution for the sound source directions shows a change from (b) in FIG. 16 in which the sound is distributed on the left and right of the user vehicle, to (c) in FIG. 16 in which the distribution on the right has increased. Similar to the first embodiment, the vehicle direction identification unit 106A can determined that a vehicle is present to the right of the user vehicle by comparing this change in the rate of occurrence distribution over time against the reflection information.

Next, a case in which a rate of occurrence distribution is formed to the left and right of the user vehicle due to vehicle sound being detected from a vehicle present to the left and a vehicle present to the right of the user vehicle will be explained.

Figure 17:
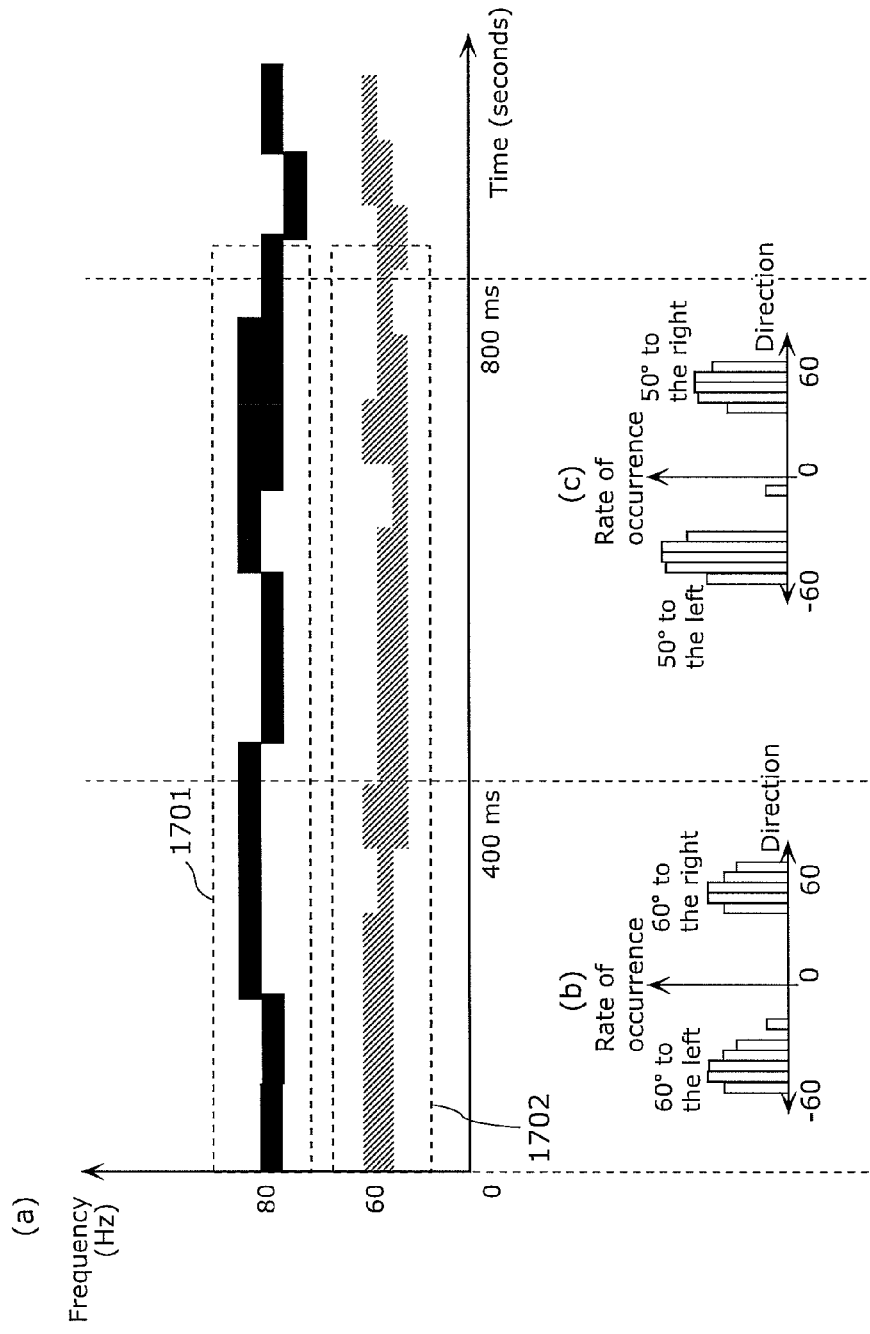
FIG. 17 is a second drawing explaining the sound source directions according to the second embodiment.

FIG. 17 explains a situation in which peaks are formed to the left and right in the rate of occurrence distribution as a result of vehicle sound being detected from a vehicle present to the left and a vehicle present to the right of the user vehicle, as is shown in FIG. 15.

Similar to (a) in FIG. 16, (a) in FIG. 17 shows a result of the sound source direction identification unit 104 identifying a sound source direction for each analysis section. Here, the vertical axis represents frequency, and the horizontal axis represents time. In this situation, if the distribution for the sound source directions is calculated as is, the direction of the sound will be distributed to the right and left of the user vehicle, as is shown in (b) and (c) in FIG. 17. However, this situation is not the result of sound being reflected, but the result of two vehicles actually being present, one on either side of the user vehicle. Nevertheless, in this situation as it stands, the vehicle direction identification device 110 cannot determine whether the result has been influenced by reflected sound or not.

Therefore, the vehicle frequency identification unit 111 identifies reference frequency bands for the vehicle sound based on analysis information for each analysis section. For example, the frequency of the section having the highest sound pressure and the frequency of the section having the second highest sound pressure from the sections identified as being vehicle sound (for example, the analysis sections colored solid black or with black diagonal lines in (a) in FIG. 17) are specified as reference frequencies. Then, two reference frequency bands are specified based on these two frequencies. For (a) in FIG. 17, the vehicle frequency identification unit 111 specifies 60 Hz and 80 Hz as the reference frequencies, and as reference frequency bands corresponding thereto, specifies a reference frequency band 1702 and a reference frequency band 1701.

The vehicle direction identification unit 106A then identifies whether or not the vehicle sound is reflected sound or not based on the change over time in the rate of occurrence distribution for the sound source directions included in the reference frequency band 1701 and the reference frequency band 1702.

As is shown in (a) in FIG. 17, when the vehicle direction identification unit 106A checks only the reference frequency band 1702 centered on 60 Hz (±5), only sound source directions colored with black diagonal lines, that is to say, only sound source directions to the left of the user vehicle are detected.

On the other hand, when the vehicle direction identification unit 106A checks only the reference frequency band 1701 centered on 80 Hz (±5), only sound source directions colored solid black, that is to say, only sound source directions to the right of the user vehicle are detected. Moreover, even if the vehicle direction identification unit 106A checks the change over time in the rate of occurrence distribution for the sound source directions included in the reference frequency band 1701 and the reference frequency band 1702 against the reflection information, a match will not be found among the reflection patterns. Thus, the vehicle direction identification unit 106A can determine that two vehicles, one to the right and one to the left of the user vehicle, are actually present (in other words, every piece of vehicle sound is direct sound).

In this way, in a case in which two vehicles are actually present, one to the right and one to the left, and vehicle sound comes from the right and the left, the vehicle direction identification unit 106A cannot determine if the vehicle sound is reflected sound when handling the individual vehicle sound directions as a single distribution. However, by separating the vehicle sound using reference frequency bands and identifying the direction in which the vehicle is present using the sound source directions included in each reference frequency band, the vehicle direction identification unit 106A can determine if the vehicle sound is reflected sound and can identify the direction in which the vehicle is present.

On the other hand, when vehicle sound comes from both the left and right due to vehicle sound from a single vehicle being reflected, sound source directions from both the left and right are detected in single specified reference frequency band, as is shown in FIG. 16. Therefore, as a result of the vehicle direction identification unit 106A checking the rate of occurrence distribution and the change over time in the rate of occurrence distribution for the sound source directions included in the single specified reference frequency band originating from the single vehicle, it becomes possible to accurately identify the direction in which the vehicle is present from vehicle sound, including reflected sound.

Next, the operation flow of the present disclosure will be discussed with reference to FIG. 18 and FIG. 11.

Figure 18:
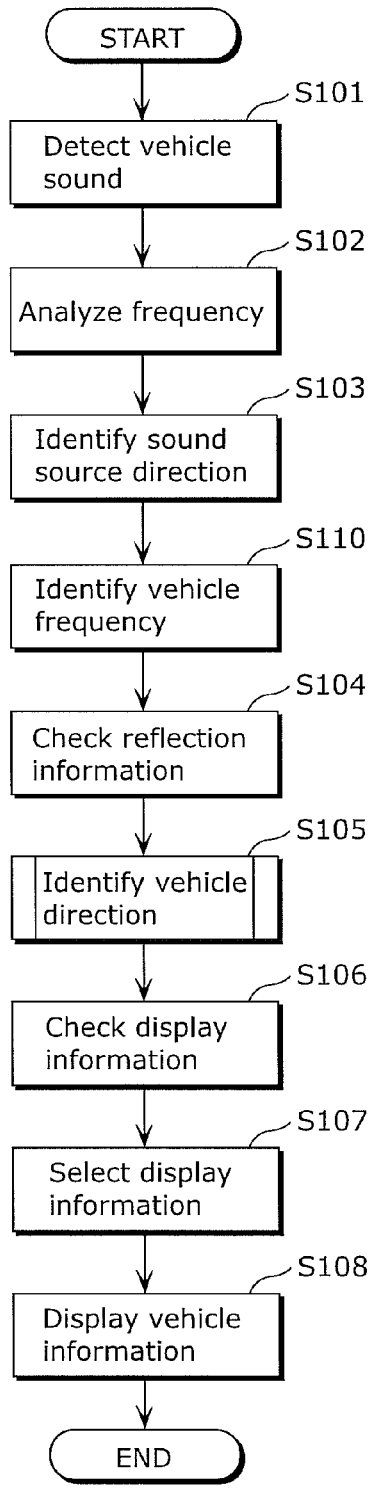
FIG. 18 is a first flow chart illustrating the flow of processes performed by the vehicle direction identification device according to the second embodiment.

FIG. 18 illustrates the flow of processes performed by the vehicle direction identification device according to the second embodiment.

First, as shown in FIG. 18, vehicle sound is detected by the vehicle sound detection microphone 101 and 102 (step S101). Next, frequency analysis is performed by the frequency analysis unit 103A (step S102). Then the sound source direction of each analysis section is identified by the sound source direction identification unit 104 based on the sound arrival time difference (step S103).

Next, the vehicle frequency identification unit 111 identifies reference frequency bands for the vehicle. For example, the frequency having the highest sound pressure is specified as the reference frequency, and an acceptable range (for example ±5 Hz) centered on the reference frequency is specified as the reference frequency band.

Next, the vehicle direction identification unit 106A checks the reflection information stored in the reflection information storage unit 105 (step S104). Then, using the sound source information identified in step S103 and the reference frequency band specified in step S110, the vehicle direction identification unit 106A determines whether the vehicle sound is reflected sound or not and identifies the direction in which the car is present based on the sound source directions included in the reference frequency band (step S105).

Next, details regarding the flow of processes in step S105 will be explained with reference to FIG. 11

The vehicle direction identification unit 106A first calculates the rate of occurrence for each sound source direction (step S201). For example, the rate of occurrence (as well as the rate of occurrence distribution) for each sound source direction, such as is shown in (b) in FIG. 8, is calculated.

Next the vehicle direction identification unit 106A repeats (loops) this process for each reflection pattern included in the reflection information (step S202), and determines whether the distribution of the sound source directions corresponds with the first state in a given reflection pattern or not (step S203).

That is, the vehicle direction identification unit 106A selects one of the reflection patterns from the plurality of reflection patterns stored in the reflection information storage unit 105, and repeats (loops) the process described below for each reflection pattern (step S202).

To explain in more detail, the vehicle direction identification unit 106A determines whether or not the rate of occurrence distribution for the sound source directions meets the conditions set forth as the first state in the selected reflection pattern (step S203).

If the rate of occurrence distribution for the sound source directions meets the conditions set forth as the first state in the selected reflection pattern (YES in step S203), the vehicle direction identification unit 106A checks the rate of occurrence distribution for the vehicle sound obtained in a subsequent predetermined time period (for example, 400 ms) (step S204). Next, the vehicle direction identification unit 106A determines whether or not the rate of occurrence distribution meets the conditions set forth in the second state in the selected reflection pattern (step S205). That is, the vehicle direction identification unit 106A checks if the change in the rate of occurrence distribution over time matches with the state transition model shown as the reflection pattern.

Once again, if the rate of occurrence distribution meets the conditions set forth as the second state in the selected reflection pattern (YES in step S205), the vehicle direction identification unit 106A identifies that the vehicle sound is the reflected sound shown in the selected reflection pattern (step S207). Moreover, the direction in which the vehicle is present is identified as the estimated vehicle direction included in the selected reflection pattern.

On the other hand, if the rate of occurrence distribution does not meet the conditions set forth as the first state in the selected reflection pattern (NO in step S203), or the conditions set forth as the second state (NO in step S205), the vehicle direction identification unit 106A selects the next, different reflection pattern stored in the reflection information storage unit 105, and repeats (loops) the same processes (step S206).

It is to be noted that what is being explained here is the checking of the actual change in the rate of occurrence distribution over time against the transition from the first state to the second state, shown as a reflection pattern, as performed by vehicle direction identification unit 106A. However, it is acceptable if the actual change in the rate of occurrence distribution over time is checked against a reflection pattern that is a state transition model which includes a self-transition, such as one in which the loop is performed on the first state a given number of times before transitioning to the second state, as is shown in FIG. 7B.

Next, the display control unit 108 refers to the display modes stored in the display information storage unit 107 (step S106) and selects a display mode (step S107). Lastly, the vehicle display unit 109 displays the vehicle information using the selected display mode (step S108).

It is to be noted that the vehicle direction identification device 110A according to the second embodiment calculated the reference frequency of the vehicle using sound pressure (that is, amplitude), and obtained the rates of occurrence within the reference frequency band having an allowable margin of error centered on the specified reference frequency. However, the vehicle frequency identification unit 111 may obtain a peak in the reference frequency as needed, and calculate the rates of occurrence in the frequency region corresponding to the reference frequency while continuing to track the reference frequency which changes according to speed. By following a sound tone according to the speed of the vehicle, the vehicle direction identification device 110A can focus solely on that vehicle and can more clearly differentiate between direct sound and reflected sound from the vehicle, thereby increasing the accuracy of the determination of whether vehicle sound is reflected sound or not and the identification of the direction in which the vehicle is present.

Moreover, even if there is only one vehicle present, there are cases in which a plurality of reference frequency bands are specified as a result of the frequency bands corresponding to harmonic and half harmonic sound having peaks. Particularly lower frequencies such as around 50 Hz or 100 Hz have a given sound tone such as described. For that reason, even if a plurality of reference frequency bands are identified from the sound tone of vehicle sound from a single vehicle due to the influence of harmonic sounds are, the vehicle direction identification device 110A according to the second embodiment can accurately identify reflected sound and the direction in which the vehicle is present. This will be discussed further below with reference to FIG. 19 and FIG. 20.

Figure 19:
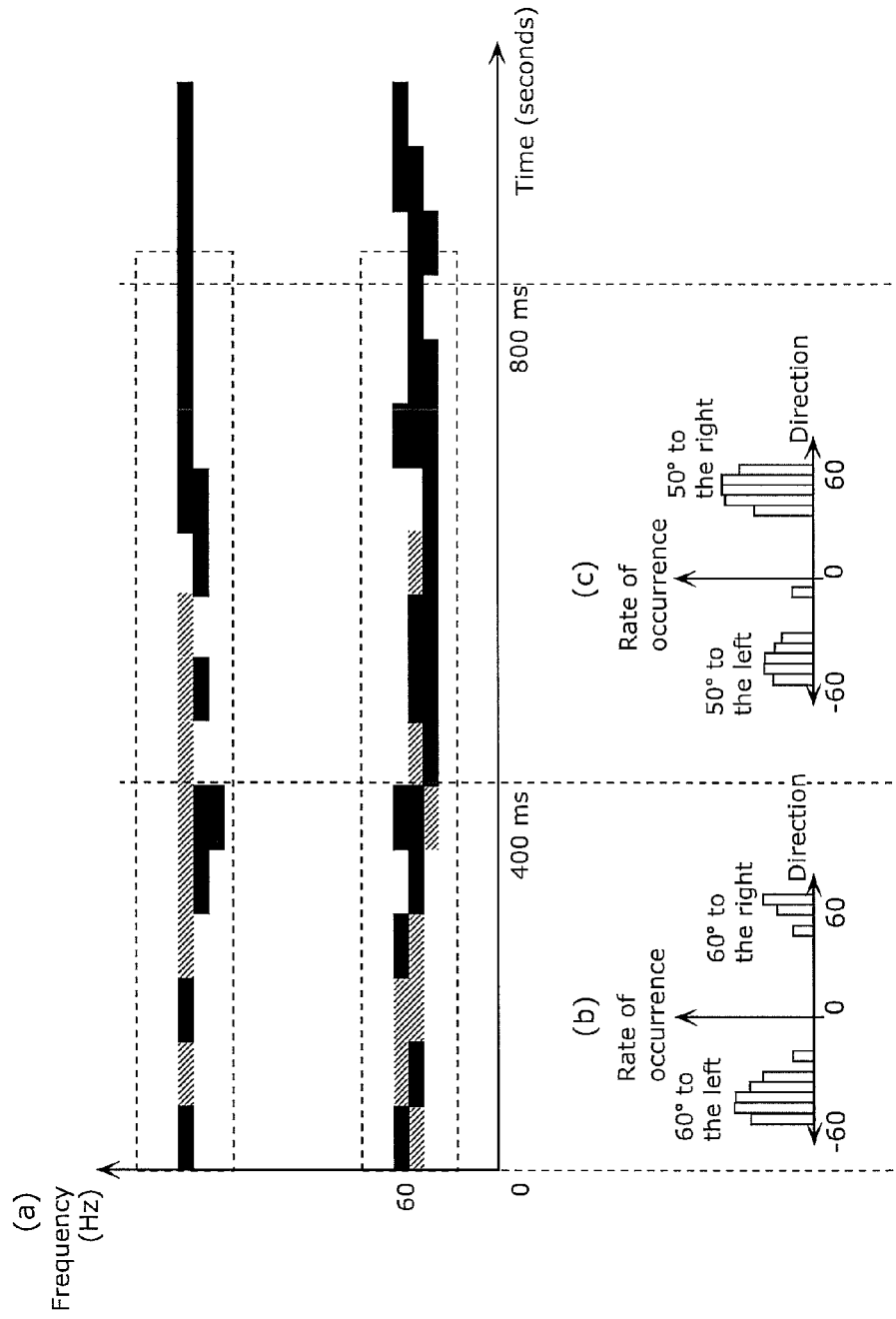
FIG. 19 is a third drawing explaining the sound source directions according to the second embodiment.

FIG. 19 shows the direction of a piece of sound source in each predetermined frequency and time interval. (a) in FIG. 19 shows a situation in which a single car is present in a blind spot shielded by a barrier to the right of the user vehicle, similar to in FIG. 4, and shows analysis sections for which directions of the sound therein have been identified by the sound source direction identification unit 104. Here, the vertical axis represents frequency, and the horizontal axis represents time.

As shown in (a) in FIG. 19, the single vehicle is generating vehicle sound having a given sound pressure in area of 60 Hz and 120 Hz. Moreover, each of these vehicle sounds includes both reflected sound arriving from the left of the user vehicle and direct sound arriving from the right of the user vehicle (that is, sound source directions both to the right and left of the user vehicle are calculated in both the 60 Hz frequency band and the 120 Hz frequency band).

Therefore, the vehicle frequency identification unit 111 identifies reference frequency bands for the vehicle sound based on analysis information (for example, amplitude) for each analysis section. For example, the frequency of a section (a section colored solid black or with black diagonal lines) identified as vehicle sound and having a sound pressure higher than a predetermined threshold value is specified as a reference frequency, and a range having a given breadth centered on the reference frequency is specified as a reference frequency band.

In the case of FIG. 19, the frequency band centered on 60 Hz and the frequency band centered on 120 Hz are identified as the reference frequency bands. The vehicle direction identification unit 106A checks the change over time in the rate of occurrence distribution for the sound source directions for each of the frequency bands, determines whether the vehicle sound is reflected sound or not, and identifies the direction in which the vehicle is present.

Next, a case in which a rate of occurrence distribution is formed to the left and right of the user vehicle due to vehicle sound being detected from two vehicles, one present to the left and one present to the right of the user vehicle, will be explained.

Figure 20:
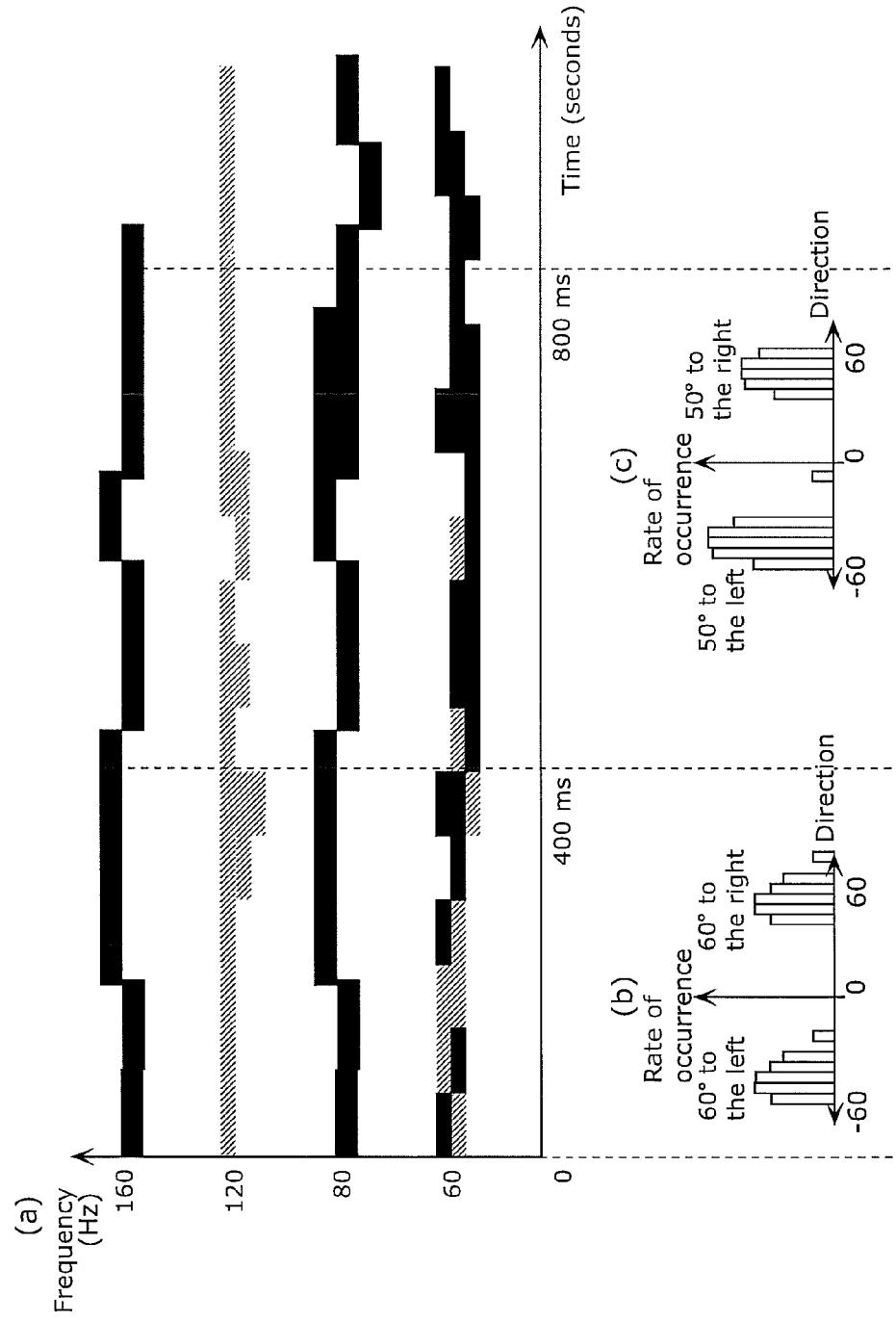
FIG. 20 is a fourth drawing explaining the sound source directions according to the second embodiment.

FIG. 20 explains a situation in which vehicle sound is detected on both sides of the user vehicle as a result of a vehicle being present to the left and a vehicle present to the right of the user vehicle, as is shown in FIG. 15.

Similar to (a) in FIG. 16, (a) in FIG. 20 shows analysis sections for which a direction of the sound therein has been identified by the sound source direction identification unit 104. Here, the vertical axis represents frequency, and the horizontal axis represents time. In this situation, if the distribution for the sound source directions is calculated as is, the direction of the sound source will be distributed to the right and left of the user vehicle, as is shown in (b) and (c) in FIG. 20. However, this situation is not the result of sound being reflected, but the result of two vehicles actually being present, one on either side of the user vehicle. Nevertheless, in this situation as it stands, it cannot be determined whether the vehicle sound is reflected sound or not.

Therefore, the vehicle frequency identification unit 111 identifies reference frequency bands for the vehicle sound based on analysis information for each analysis section.

For example, the frequency of a section (for example, a section colored solid black or with black diagonal lines in (a) in FIG. 20) identified as vehicle sound and having an amplitude that is higher than a predetermined threshold value is specified as a reference frequency, and a range having a given breadth centered on the reference frequency is specified as the reference frequency band. In the case of (a) in FIG. 20, reference frequency bands are identified centering on 60 Hz, 80 Hz, 120 Hz, and 160 Hz.

The vehicle direction identification unit 106A then, for each reference frequency band, identifies whether or not the vehicle sound is reflected sound or not based on a change over time in the distribution. When the vehicle direction identification unit 106A checks only the reference frequency bands centered on 60 Hz (±5) and 120 Hz (±5), only regions colored with black diagonal lines, that is, only sound to the left is detected. On the other hand, when the vehicle direction identification unit 106A checks only the reference frequency bands centered on 80 Hz (±5) and 160 Hz (±5), only regions colored solid black, that is, only sound to the right is detected.

Furthermore, even if the vehicle direction identification unit 106A checks the change over time in the actual rate of occurrence distribution against the reflection information, the rate of occurrence distribution will not match any of the reflection patterns. For this reason, the vehicle direction identification unit 106A can determine that two vehicles, one to the left and one to the right of the user vehicle, are actually present.

In this way, even if peaks are formed to the right and the left in the rate of occurrence distribution for vehicle sound due to two vehicles, one to the left and one to the right of the user vehicle, actually being present, the vehicle direction identification unit 106A is capable of determining whether the vehicle sound is reflected sound or not by separating the rate of occurrence distributions by reference frequency bands.

Here, the reflection information may include one or more reflection patterns that are different for each frequency. In that case, a representative value of the range of the rates of occurrence indicated by the first rate of occurrence information and a representative value of the range of the rates of occurrence indicated by the second rate of occurrence information included in each of the reflection patterns may be set to increase as the frequency increases. For example, consider a situation in which the first rate of occurrence information included in the reflection pattern associated with a frequency range from 50 Hz to 350 Hz is 500 (±250), and the second rate of occurrence information is 300 (±150). Here, when using an average value as the representative value, the representative value of the first rate of occurrence information is 500, and the representative value of the second rate of occurrence information is 300. Therefore, it can be assumed that the first rate of occurrence information included in the reflection pattern associated with a frequency range from 700 Hz to 950 Hz is 600 (±250), and the second rate of occurrence information is 400 (±150). That is, the higher the frequency of the sound, the higher the rate of occurrence generally tends to be. For that reason, it is possible to determine if a sound is reflected sound more adequately by changing the rate of occurrence information accordingly with respect to frequency.

It is to be noted that the reference frequency band according to the second embodiment may have a range of approximately 10 kHz centered on the reference frequency.

It is to be noted that the vehicle direction identification unit according to either the first or the second embodiment may refer to an analysis section adjacent to the previously noted analysis section horizontally along the time axis, or vertically along the frequency axis. When the adjacent analysis section has the same sound source direction or a direction within ±5 degrees, the previously noted analysis section may be weighted in such a way that the greater the degree of similarity, the greater the weight assigned is. In this instance, for example, for each sound source direction, the rate of occurrence may be calculated as the number of weighted analysis sections of the corresponding sound source direction. It is to be noted that "the greater the degree of similarity" with respect to the sound source directions corresponding to the adjacent analysis sections means, for example, "the smaller the difference in sound source directions" of the adjacent analysis sections.

Specifically, when the analysis sections A, B, and C identified as having a sound source direction of +30 degrees have a weighted value of 1.2, 1.0, and 1.1, respectively, the rate of occurrence corresponding to the sound source direction of +30 degrees is calculated to be 3.3 (3.3=1×1.2+1×1.0+1×1.1).

Although vehicle sound includes a margin of error, there is a tendency for a majority of the sound source directions to be distributed in a direction in which a vehicle is actually present. However, the occurrence of noise such as wind noise is instantaneous and random, and the sound source directions of noises generally vary from segment to segment. Consequently, as a result of the vehicle direction identification unit attributing weight in this manner instead of simply summing the segments upon calculating the rates of occurrence, vehicle sound can be identified with increased accuracy.

It is to be noted that the vehicle direction identification device according to the first and second embodiments can function successfully in the same manner even without equipment of the vehicle sound detection microphone 101 and 102.

The vehicle direction identification device functions successfully in the same manner as it does when equipped with the vehicle sound detection microphone 101 and 102 when surrounding sound is obtained by a microphone equipped outside of the vehicle direction identification device, and a signal of the obtained surrounding sound is transmitted and input into the vehicle direction identification device wirelessly or by wire.

It is to be noted that the vehicle direction identification device and the vehicle direction identification system described in either the first or second embodiment can be implemented as a computer.

Figure 21:
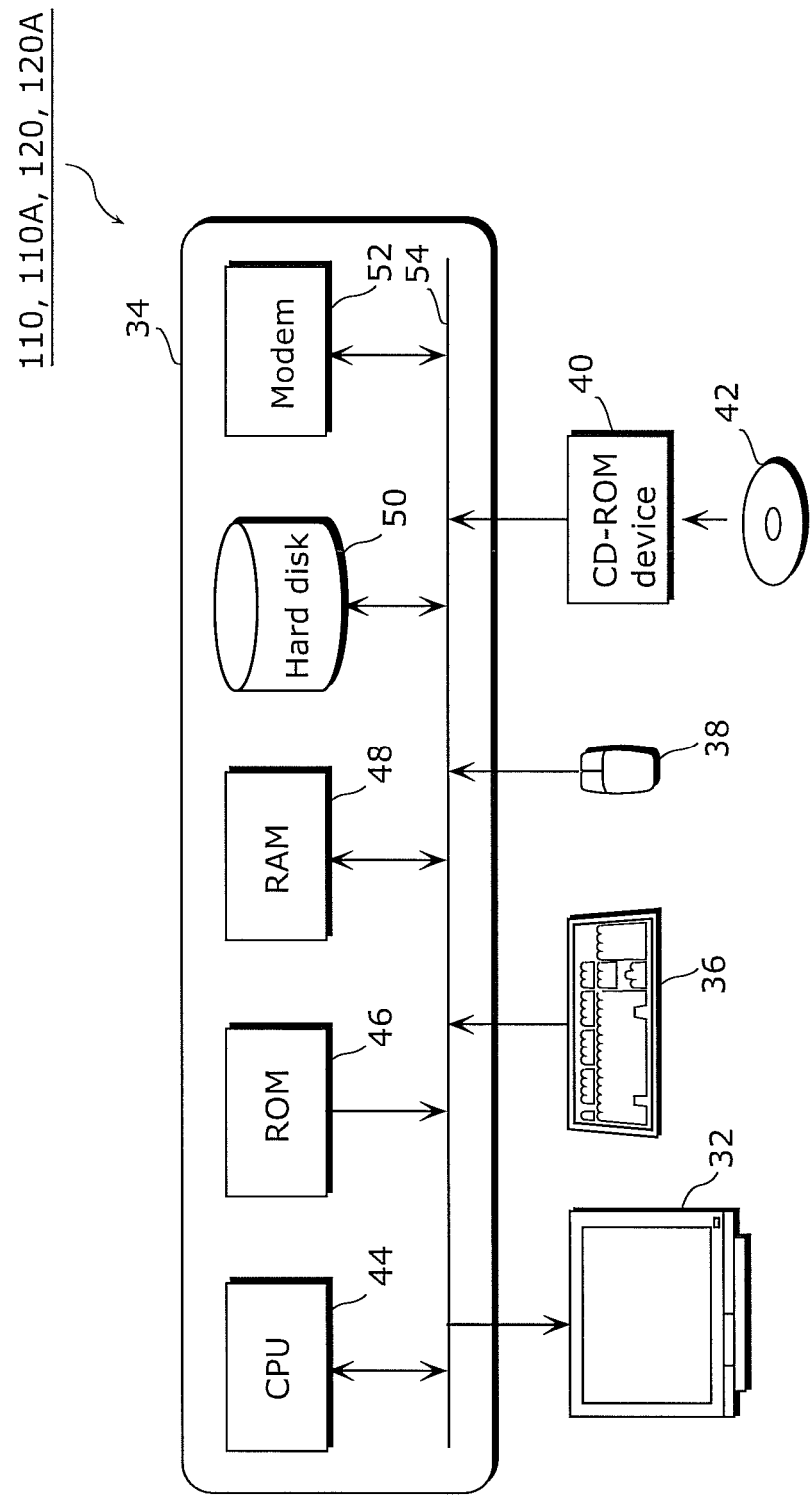
FIG. 21 is a block diagram showing the hardware configuration of a computer system implemented as the vehicle direction identification device according to either the first or second embodiment.
Figure 22A:
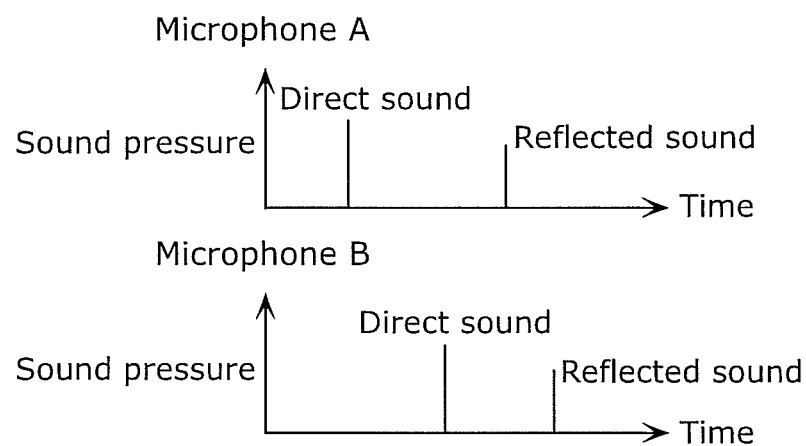
FIG. 22A is a first drawing explaining a conventional technique.
Figure 22B:
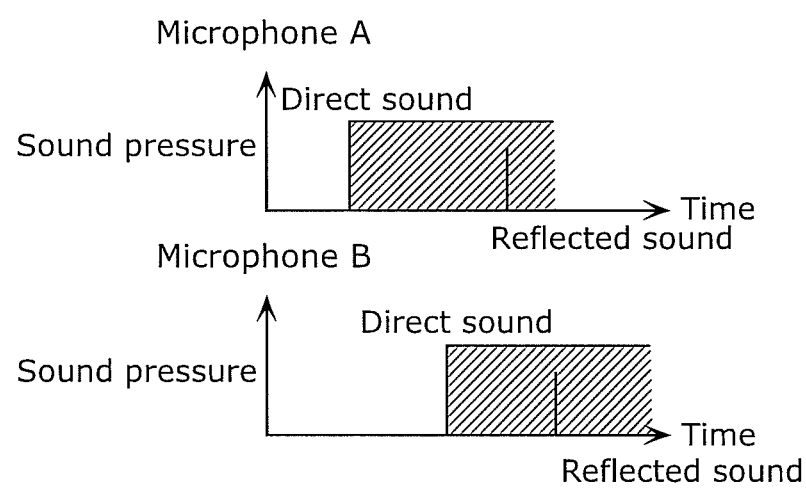
FIG. 22B is a second drawing explaining a conventional technique.

FIG. 21 shows the configuration of computer system hardware implementing the vehicle direction identification device 110 and the vehicle direction identification device 110A, as well as the vehicle direction identification system 120 and the vehicle direction identification system 120A (hereinafter referred to as the vehicle direction identification device group).

The vehicle direction identification device group includes a computer 34, a keyboard 36 and a mouse 38 for inputting commands into the computer 34, a display 32 for displaying information such as computations made by the computer 34, a Compact Disc-Read Only Memory (CD-ROM) device 40 and a modem (not shown in drawing) for reading programs executed by the computer 34.

The program which is processed by the vehicle direction identification device group is recorded on a CD-ROM 42, which is a computer-readable medium, then read by the CD-ROM device 40, or read by a modem 52 over a computer network.

The computer 34 includes a central processing unit (CPU) 44, read only memory (ROM) 46, random access memory (RAM) 48, a hard disk 50, the modem 52, and a bus 54.

The CPU 44 executes the program read via the CD-ROM device 40 or the modem 52. The ROM 46 stores programs and/or data necessary for the computer 34 to operate. The RAM 48 stores data such as parameters when a program is executed. The hard disk 50 stores programs and/or data. The modem 52 communicates with other computers via a computer network. The bus 54 connects the CPU 44, the ROM 46, the RAM 48, the hard disk 50, the modem 52, the display 32, the keyboard 36, the mouse 38, and the CD-ROM device 40.

Furthermore, a portion or all of the components of each of the preceding devices may be configured from one system LSI (Large Scale Integration). A system LSI is a super-multifunction LSI manufactured with a plurality of components integrated on a single chip, and is specifically a computer system configured of a microprocessor, ROM, and RAM, for example. The computer program is stored in the RAM. The system LSI achieves its function as a result of the microprocessor operating according to the computer program.

Still furthermore, a portion or all of the components of each of the preceding devices may each be configured from a detachable IC card or a stand-alone module. The IC card and the module are computer systems configured from a microprocessor, ROM, and RAM, for example. The IC card and the module may include the super-multifunction LSI described above. The IC card and the module achieve their function as a result of the microprocessor operating according to a computer program. The IC card and the module may be tamper-proof.

Moreover, the present disclosure may be realized as the above-described method. Moreover, the present invention may also be a computer program realizing these methods with a computer, or a digital signal of the computer program.

Furthermore, the present disclosure may also be realized as the computer program or the digital signal stored on storage media readable by a computer, such as a flexible disk, hard disk, CD-ROM, MO, DVD, DVD-ROM, DVD-RAM, DVD-RAM, BD (Blu-ray Disc (registered trademark)), USB memory, memory card such as an SD card, or a semiconductor memory. The present invention may also be the digital signal stored on the above mentioned storage media.

Moreover, the present disclosure may also be realized by transmitting the computer program or the digital signal, for example, via an electric communication line, a wireless or wired line, a network such as the Internet, or data broadcasting.

Moreover, the present disclosure may be a computer system including memory storing the computer program and a microprocessor operating according to the computer program.

Moreover, the computer program or the digital signal may be implemented by an independent computer system by being stored on the storage media and transmitted, or sent via the network.

Furthermore, the preceding embodiments and the preceding variation examples may be individually combined.

The disclosed embodiments are exemplifications in all aspects, and are not intended to be limiting. Equivalents of the Claims and various modifications are intended to be included in these exemplary embodiments which do not depart from the principles and spirit of the inventive concept, the scope of which is defined in the appended Claims and not the above-described exemplary embodiments.

INDUSTRIAL APPLICABILITY

One or more exemplary embodiments disclosed herein are applicable to vehicle direction identification devices that can identify the direction in which a vehicle is present from vehicle sound.

The invention claimed is:

1. A vehicle direction identification device which identifies a direction in which a vehicle in a vicinity of a user vehicle is present from vehicle sound that originates from the vehicle in the vicinity and is obtained by a plurality of microphones, the vehicle direction identification device comprising:
   a frequency analysis unit configured to analyze phase of the vehicle sound in each of a plurality of analysis sections specified by predetermined frequency regions and predetermined time intervals;
   a sound source direction identification unit configured to identify, based on a result of the analysis obtained from the frequency analysis unit, a sound source direction for each of the plurality of analysis sections, the sound source direction indicating a direction from which a sound included in the vehicle sound originates;
   a reflection information storage unit configured to store reflection information including one or more reflection patterns each of which includes (i) a plurality of items of state information each relating to rates of occurrence and (ii) an estimated vehicle direction, the rates of occurrence each being a count of one or more of the analysis sections of a corresponding one of the sound source directions, and the estimated vehicle direction being a direction in which the vehicle in the vicinity is present that is associated with the set of the items of state information; and
   a vehicle direction identification unit configured to identify a direction in which the vehicle in the vicinity is present by checking the rates of occurrence against one of the reflection patterns, the rates of occurrence obtained from a result of the identification by the sound source direction identification unit.

2. The vehicle direction identification device according to claim 1,
   wherein each of the reflection patterns includes first state information relating to the rates of occurrence in a first state, second state information relating to the rates of occurrence in a second state, and the estimated vehicle direction associated with a set including the first state information and the second state information, the second state lasting a predetermined length of time after the first state elapses,
   the first state information includes first direction information and second direction information which indicate a range of the sound source directions, first rate of occurrence information which is associated with the first direction information and indicates a range of the rates of occurrence, and second rate of occurrence information which is associated with the second direction information and indicates a range of the rates of occurrence,
   the second state information includes third direction information and fourth direction information which indicate a range of the sound source directions, third rate of occurrence information which is associated with the third direction information and indicates a range of the rates of occurrence, and fourth rate of occurrence information which is associated with the fourth direction information and indicates a range of the rates of occurrence, and
   when a plurality of the sound source directions in the first state meet conditions set forth as the first state information, and a plurality of the sound source directions in the second state meet conditions set forth as the second state information, the vehicle direction identification unit is configured to determine that the vehicle sound is reflected sound, and identify, as the direction in which the vehicle in the vicinity is present, the estimated vehicle direction associated with the set including the first state information and the second state information.

3. The vehicle direction identification device according to claim 2,
   wherein the vehicle direction identification unit is configured to calculate the rates of occurrence for the plurality of the sound source directions included in the vehicle sound obtained in the first state which is a first time period, and when, from among the rates of occurrence calculated, (i) a total of the rates of occurrence for the sound source directions included in the range indicated by the first direction information is included in the range indicated by the first rate of occurrence information, and (ii) a total of the rates of occurrence for the sound source directions included in the range indicated by the second direction information is included in the range indicated by the second rate of occurrence information, the vehicle direction identification unit is configured to calculate the rates of occurrence for the plurality of the sound source directions included in the vehicle sound obtained in the second state which is a second time period lasting the predetermined length of time after the first time period elapses, and when, from among the rates of occurrence newly calculated, (iii) a total of the rates of occurrence for the sound source directions included in the range indicated by the third direction information is included in the range indicated by the third rate of occurrence information, and (iv) a total of the rates of occurrence for the sound source directions included in the range indicated by the fourth direction information is included in the range indicated by the fourth rate of occurrence information, the vehicle direction identification unit is configured to determine that the vehicle sound is reflected sound, and identify the estimated vehicle direction associated with the set including the first state information and the second state information as the direction in which the vehicle in the vicinity is present.

4. The vehicle direction identification device according to claim 2,
wherein the reflection information includes one or more of the reflection patterns in which (i) an absolute value of a difference between representative values of respective ranges of the rates of occurrence indicated by two pieces of the rate of occurrence information included in one of the first state information and the second state information is less than a predetermined first difference, and (ii) an absolute value of a difference between representative values of respective ranges of the rates of occurrence indicated by two pieces of the rate of occurrence information included in the other of the first state information and the second state information is greater than a predetermined second difference that is greater than the first difference.

5. The vehicle direction identification device according to claim 4,
wherein the reflection information includes one or more of the reflection patterns including, as the estimated vehicle direction, a direction corresponding to the direction information associated with the rate of occurrence information having a greater representative value of the third rate of occurrence information and the fourth rate of occurrence information when (i) an absolute value of a difference of a representative value of the range of the rates of occurrence indicated by the first rate of occurrence information and a representative value of the range of the rates of occurrence indicated by the second rate of occurrence information is less than the first difference, and (ii) an absolute value of a difference of a representative value of the range of the rates of occurrence indicated by the third rate of occurrence information and a representative value of the range of the rates of occurrence indicated by the fourth rate of occurrence information is greater than the second difference.

6. The vehicle direction identification device according to claim 4,
wherein the reflection information includes one or more of the reflection patterns including, as the estimated vehicle direction, a direction corresponding to the direction information associated with the rate of occurrence information having a lesser representative value of the first rate of occurrence information and the second rate of occurrence information when (i) an absolute value of a difference of a representative value of the range of the rates of occurrence indicated by the first rate of occurrence information and a representative value of the range of the rates of occurrence indicated by the second rate of occurrence information is greater than the second difference, and (ii) an absolute value of a difference of a representative value of the range of the rates of occurrence indicated by the third rate of occurrence information and a representative value of the range of the rates of occurrence indicated by the fourth rate of occurrence information is less than the first difference.

7. The vehicle direction identification device according to claim 1,
wherein the reflection information includes the one or more reflection patterns that are different for each frequency.

8. The vehicle direction identification device according to claim 7,
wherein a representative value of the range of the rates of occurrence indicated by the first rate of occurrence information and a representative value of the range of the rates of occurrence indicated by the second rate of occurrence information included in each of the reflection patterns are set to increase as the frequency increases.

9. The vehicle direction identification device according to claim 1,
further comprising a vehicle frequency identification unit configured to identify a reference frequency band for the vehicle sound,
wherein the frequency analysis unit is configured to analyze the phase and amplitude of the vehicle sound in each of the plurality of analysis sections,
the vehicle frequency identification unit is configured to identify, as an N-th reference frequency, a representative value that represents a frequency corresponding to an analysis section having an N-th highest amplitude among the plurality of analysis sections in a corresponding one of the time intervals, and identify, as an N-th reference frequency band, a frequency band having a predetermined range centered on the N-th reference frequency, and
the vehicle direction identification unit is configured to identify the direction in which the vehicle in the vicinity is present by checking a plurality of the sound source directions corresponding to the plurality of analysis sections included in the N-th reference frequency band against the reflection information.

10. The vehicle direction identification device according to claim 1,
wherein the vehicle direction identification unit is configured to assign greater weight to an analysis section among the plurality of analysis sections having a greater degree of similarity to an adjacent one of the plurality of analysis sections with respect to the respective sound source directions, and calculate the rates of occurrence for the respective sound source directions as a count of the weighted plurality of analysis sections in a corresponding one of the sound source directions.

11. The vehicle direction identification device according to claim 1,
wherein the sound source direction identification unit is configured to determine, for each of the plurality of analysis sections, whether the amplitude of the vehicle sound therein is below a sound pressure threshold value or not, and configured to avoid identifying one of the plurality of analysis sections for identification of the vehicle direction when the amplitude of the vehicle sound therein is below the sound pressure threshold value, and
the sound pressure threshold value increases as a frequency corresponding to the analysis section increases.

12. A vehicle direction identification system comprising:
the vehicle direction identification device according to claim 1;
a vehicle display unit configured to display a direction in which the vehicle in the vicinity identified by the vehicle direction identification device is present;
a display information storage means configured to store a plurality of display modes for identifying a manner in which the vehicle in the vicinity is to be represented on the vehicle display unit; and
a display control unit configured to cause the vehicle display unit to display the vehicle in the vicinity (i) using a first display mode included in the plurality of display modes when the vehicle direction identification device determines that the vehicle sound is reflected sound, and (ii) using a second display mode which is included in the plurality of display modes and is different from the first display mode when the vehicle direction identification device determines that the vehicle sound is not reflected sound.

13. A vehicle direction identification method of identifying a direction in which a vehicle in a vicinity of a user vehicle is present from vehicle sound that originates from the vehicle in the vicinity and is obtained by a plurality of microphones, the vehicle direction identification method comprising:

analyzing phase of the vehicle sound in each of a plurality of analysis sections specified by predetermined frequency regions and predetermined time intervals;

identifying, based on a result of the analysis obtained in the analyzing, a sound source direction for each of the plurality of analysis sections, the sound source direction indicating a direction from which a sound included in the vehicle sound originates; and identifying a direction in which the vehicle in the vicinity is present by checking the rates of occurrence against a reflection pattern, the rates of occurrence obtained from a result of the identification in the identifying of the sound source direction and being a count of one or more of the analysis sections of a corresponding one of the sound source directions, wherein the reflection pattern includes (i) a plurality of items of state information each relating to the rate of occurrence and (ii) an estimated vehicle direction which is a direction in which the vehicle in the vicinity is present that is associated with a set of the items of state information.

14. A non-transitory computer-readable recording medium for use in a computer, the recording medium having a computer program recorded thereon for causing the to execute the vehicle direction identification method according to claim 13.

15. An integrated circuit identifying a direction in which identifies a direction in which a vehicle in a vicinity of a user vehicle is present from vehicle sound that originates from the vehicle in the vicinity and is obtained by a plurality of microphones, the vehicle direction identification device comprising:

a frequency analysis unit configured to analyze phase of the vehicle sound in each of a plurality of analysis sections specified by predetermined frequency regions and predetermined time intervals;

a sound source direction identification unit configured to identify, based on a result of the analysis obtained from the frequency analysis unit, a sound source direction for each of the plurality of analysis sections, the sound source direction indicating a direction from which a sound included in the vehicle sound originates;

a reflection information storage unit configured to store reflection information including one or more reflection patterns each of which includes (i) a plurality of items of state information each relating to rates of occurrence and (ii) an estimated vehicle direction, the rates of occurrence each being a count of one or more of the analysis sections of a corresponding one of the sound source directions, and the estimated vehicle direction being a direction in which the vehicle in the vicinity is present that is associated with the set of the items of state information; and a vehicle direction identification unit configured to identify a direction in which the vehicle in the vicinity is present by checking the rates of occurrence against one of the reflection patterns, the rates of occurrence obtained from a result of the identification by the sound source direction identification unit.

* * * * *